United States Patent
Kawai

(10) Patent No.: US 7,643,903 B2
(45) Date of Patent: *Jan. 5, 2010

(54) METHOD OF ASSUMING ACTING POINT OF FLOOR REACTION FORCE TO BIPED WALKING MOBILE BODY AND METHOD OF ASSUMING JOINT MOMENT OF BIPED WALKING MOBILE BODY

(75) Inventor: Masakazu Kawai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 649 days.

This patent is subject to a terminal disclaimer.

(21) Appl. No.: 10/553,278

(22) PCT Filed: Mar. 29, 2004

(86) PCT No.: PCT/JP2004/004459

§ 371 (c)(1),
(2), (4) Date: Oct. 13, 2005

(87) PCT Pub. No.: WO2004/091866

PCT Pub. Date: Oct. 28, 2004

(65) Prior Publication Data

US 2006/0200272 A1    Sep. 7, 2006

(30) Foreign Application Priority Data

Apr. 17, 2003    (JP)    ............... 2003-113060

(51) Int. Cl.
*G06F 19/00*    (2006.01)

(52) U.S. Cl. ............... 700/245; 700/246; 700/251; 700/253; 700/260; 700/261; 318/568.1; 318/568.12; 318/568.16; 318/568.17; 318/568.2; 901/1; 901/9; 901/46

(58) Field of Classification Search ............... 700/245, 700/246, 251, 253, 260, 261; 318/568.1, 318/568.12, 568.16, 568.17, 568.2; 901/1, 901/9, 46

See application file for complete search history.

(56) References Cited

U.S. PATENT DOCUMENTS 6,243,623 B1 *    6/2001    Takenaka et al. ............ 700/253

(Continued)

FOREIGN PATENT DOCUMENTS

EP    1 018 467    7/2000

(Continued)

*Primary Examiner*—Khoi Tran
*Assistant Examiner*—McDieunel Marc
(74) *Attorney, Agent, or Firm*—Rankin, Hill & Clark LLP

(57) ABSTRACT

While a biped walking mobile body is in a motion, such as level-ground walking, the position of the center of gravity (G0) of the biped walking mobile body, the position of an ankle joint (12) of each leg (2), and the position of a metatarsophalangeal joint (13a) of a foot (13) are successively grasped. The horizontal position of any one of the center of gravity (G0), the ankle joint (12), and the metatarsophalangeal joint (13a) is estimated as the horizontal position of a floor reaction force acting point on the basis of the combination of the contact or no contact with the ground at a spot directly below the metatarsophalangeal joint 13a of the foot 13 and a spot directly below the ankle joint 12, which is detected by ground contact sensors 51f and 51r, respectively, provided on the sole of the foot 13. The vertical position of the floor reaction force acting point is estimated on the basis of the vertical distance from the ankle joint (12) to a ground contact surface.

5 Claims, 21 Drawing Sheets

U.S. PATENT DOCUMENTS

| | | | |
|---|---|---|---|
| 6,289,265 B1 * | 9/2001 | Takenaka et al. | 318/568.12 |
| 6,330,494 B1 * | 12/2001 | Yamamoto | 700/261 |
| 6,480,761 B2 * | 11/2002 | Ueno et al. | 700/245 |
| 6,493,606 B2 * | 12/2002 | Saijo et al. | 700/245 |
| 6,697,709 B2 * | 2/2004 | Kuroki et al. | 700/245 |
| 7,119,510 B2 * | 10/2006 | Kawai | 318/568.12 |
| 2006/0106495 A1 * | 5/2006 | Takenaka et al. | 700/253 |

FOREIGN PATENT DOCUMENTS

| | | |
|---|---|---|
| EP | 1 084 943 | 3/2001 |
| EP | 1 120 203 | 8/2001 |
| EP | 1 291 136 | 3/2003 |
| JP | 05-305579 | 11/1993 |
| JP | 2000-249570 | 9/2000 |
| JP | 2001-029329 | 2/2001 |
| JP | 2003-048178 | 2/2003 |
| JP | 2003-089083 | 3/2003 |
| JP | 2003-220584 | 8/2003 |

* cited by examiner

DIRECTLY BELOW ANKLE GROUND CONTACT SENSOR: ON
DIRECTLY BELOW MP GROUND CONTACT SENSOR: OFF

DIRECTLY BELOW ANKLE GROUND CONTACT SENSOR: OFF
DIRECTLY BELOW MP GROUND CONTACT SENSOR: ON

LEVEL-GROUND WALKING

FIG.13 STAIRCASE DESCENT WALKING

FIG.16 STAIRCASE ASCENT WALKING

FIG.17 SITTING ONTO CHAIR

METHOD OF ASSUMING ACTING POINT OF FLOOR REACTION FORCE TO BIPED WALKING MOBILE BODY AND METHOD OF ASSUMING JOINT MOMENT OF BIPED WALKING MOBILE BODY

TECHNICAL FIELD

The present invention relates to a method of estimating the position of a floor reaction force acting point of each leg of a biped walking mobile body, such as a human being or a biped walking robot. The present invention further relates to a method of estimating the moment acting on a joint of a leg of the biped walking mobile body by using the estimated value of the position of the floor reaction force acting point.

BACKGROUND ART

To control an operation of, for example, a walking aid apparatus for assisting a human being in walking or to control a traveling motion of a biped walking robot, it is necessary to successively grasp the floor reaction forces acting on legs of the human being or the biped walking robot (to be more specific, the forces from a floor that act on ground contact portions of the legs) and the positions of floor reaction force acting points. Grasping the floor reaction forces and the floor reaction force acting points makes it possible to grasp moments or the like acting on joints of the legs of the biped walking mobile body, and to decide desired auxiliary forces of the walking aid apparatus or desired drive torques or the like of joints of the biped walking robot on the basis of the grasped moments or the like.

As a technique for grasping the floor reaction forces, one disclosed in, for example, Japanese Unexamined Patent Application Publication No. 2000-249570, has been known. According to this technique, a floor reaction force of each leg is grasped as a resultant value (linear combination) of a plurality of trigonometric functions having mutually different cycles of 1/n (n=1, 2, . . . ) of a walking cycle, because the time-dependent change waveform of a floor reaction force of each leg periodically changes during steady walking of a biped walking body. According to this technique, however, the positions of floor reaction force acting points cannot be grasped, making the technique inadequate for grasping moments acting on the joints of legs of the biped walking mobile body.

There has been also known a technique in which a biped walking mobile body is walked on a force plate installed on a floor so as to grasp floor reaction forces and the positions of floor reaction force acting points on the basis of the outputs of the force plate (refer to, for example, Japanese Unexamined Patent Application Publication No. 2001-29329). This technique, however, presents a problem in that the floor reaction forces and the positions of floor reaction force acting points can be grasped only in an environment wherein a force plate is installed, so that the technique cannot be applied to the walking of a biped walking mobile body in a normal environment.

Accordingly, the present applicant has previously proposed in, for example, Japanese Patent Application No. 2002-18798 (Japanese Unexamined Patent Application Publication No. 2003-220584), a technique that permits real-time estimation of the positions of floor reaction force acting points. This technique uses the fact that the inclination angle of a thigh of each leg or the bending angle of a knee joint has a relatively high correlation with the position of a floor reaction force acting point with respect to the ankle of each leg (the positional vector of a floor reaction force acting point, using the ankle as the reference). More specifically, according to the technique, the correlation data (e.g., data tables or arithmetic expressions) showing the correlation between the inclination angles of thighs or the bending angles of knee joints and the positions of floor reaction force acting points is created and retained in a memory beforehand, and the positions of floor reaction force acting points are estimated from the correlation data and the inclination angles of thighs or the bending angles of knee joints measured while a biped walking mobile body is walking.

However, further experiment and study by the inventors of the present application have revealed that the correlation between the inclination angles of thighs or the bending angles of knee joints and the positions of floor reaction force acting points is influenced by the walking speed or the like of a biped walking mobile body and further influenced by the motion modes of a biped walking mobile body, such as a level-ground walking mode, a staircase walking mode, and a slope walking mode. Hence, in order to properly estimate the positions of the floor reaction force acting points by the aforementioned technique, it has been necessary to prepare a plurality of types of the above correlation data for each walking speed or motion mode of the biped walking mobile body and to retain them in a memory beforehand, inconveniently taking up a major part of the capacity of the memory. There has been another inconvenience in that, when a motion mode is changed over, discontinuity in position of a floor reaction force acting point estimated on the basis of another correlation data is likely to occur before or after the changeover, resulting in a discontinuously changed estimated value of a joint moment when the estimated position of the floor reaction force acting point is used to estimate the joint moment.

The present invention has been made in view of the above background, and it is an object of the present invention to provide a floor reaction force acting point estimating method that makes it possible to grasp, in real time, the position of a floor reaction force acting point by a relatively simple technique without using a plurality of types of correlation data, and that is particularly suited for grasping the position of a floor reaction force acting point related to a human being as a biped walking mobile body.

Moreover, it is another object of the present invention to provide a method of estimating a joint moment of the biped walking mobile body that makes it possible to grasp, in real time, the moment acting on a joint, such as a knee joint of a leg, by using the aforesaid estimated value of a floor reaction force acting point.

DISCLOSURE OF INVENTION

The findings obtained by great efforts, including a variety of experiments, made by the inventors of the present application, indicate that, when a biped walking mobile body, such as a human being, is walking on a level ground, for example, the horizontal position of the floor reaction force acting point of each leg in contact with the ground is usually substantially equal to one of the positions of the horizontal position of the center of gravity of the biped walking mobile body, the horizontal position of the metatarsophalangeal joint of the foot of the leg (the joint of the thumb root of the foot), and the horizontal position of the ankle joint of the leg, depending on which place of the foot of the leg is in contact with the ground, independently of the moving speed or the motion mode or the like of the biped walking mobile body. To be more specific, on each leg, if the leg is in contact with the ground at the place substantially directly below the metatarsophalangeal joint (a place adjacent to the toe) with the heel side of the foot not in contact with the ground, then the horizontal position of the floor reaction force acting point related to the leg will be substantially equal to the horizontal position of the metatarsophalangeal joint, or if the leg is in contact with the ground at the place substantially directly below the ankle joint (a place adjacent to the heel) with the toe side of the foot not in contact with the ground, then, the horizontal position of the floor reaction force acting point related to the leg will be substantially equal to the horizontal position of the ankle joint. Further, if both the place adjacent to the toe of the foot and the place adjacent to the heel of the foot are in contact with the ground (substantially the entire sole of the foot is in contact with the ground), then the horizontal position of the floor reaction force acting point related to the leg will be substantially equal to the horizontal position of the center of gravity of the biped walking mobile body in most cases. Thus, the horizontal positions of the floor reaction force acting points of each leg can be estimated by successively grasping the center of gravity of the biped walking mobile body and the positions (especially the horizontal positions) of the ankle joint and the metatarsophalangeal joint of the leg and also by grasping which place of the foot of the leg in contact with the ground is in contact with the ground. Moreover, the vertical position of the floor reaction force acting point of each leg in contact with the ground, especially the vertical position relative to an ankle joint, is defined by the vertical distance from the ankle joint to the ground contact surface of the leg.

Thus, to fulfill the objects described above, according to a method of estimating a floor reaction force acting point of a biped walking mobile body in accordance with the present invention, i.e., a method of successively estimating the position of the floor reaction force acting point of each leg of a biped walking mobile body, in the sole of the foot of each leg of the biped walking mobile body, a first ground contact sensor and a second ground contact sensor that output ground contact detection signals based on the contact or no contact of a place directly below an ankle joint of a leg and a place directly below a metatarsophalangeal joint of the foot of the leg, respectively, are provided. The method includes a first step for successively grasping the position of the center of gravity of the biped walking mobile body, the position of the ankle joint of each leg, and the position of the metatarsophalangeal joint of the foot of the leg, respectively, and also successively grasping the vertical distance from the ankle joint to a ground contact surface of each leg in contact with the ground while the biped walking mobile body is in motion, and a second step for successively estimating selectively the horizontal position of one of the center of gravity, the ankle joint of the leg, and the metatarsophalangeal joint of the leg, the positions thereof having been determined in the first step, as the horizontal position of the floor reaction force acting point of the leg on the basis of at least the combination of contact or no contact indicated by a ground contact detection signal of the first ground contact sensor and contact or no contact indicated by a ground contact detection signal of the second ground contact sensor for each leg in contact with the ground while the biped walking mobile body is in motion, and also successively estimating the vertical position of the floor reaction force acting point of the leg as the position apart vertically downward from the ankle joint by the vertical distance from the ankle joint to the ground contact surface of the leg determined in the first step.

According to the method of estimating a floor reaction force acting point in accordance with the present invention, the position of the center of gravity of a biped walking mobile body, the position of the ankle joint of each leg, and the position of the metatarsophalangeal joint of the foot of the leg are successively grasped respectively, and the horizontal position of one of the center of gravity, the ankle joint, and the metatarsophalangeal joint is selectively estimated successively as the horizontal position of the floor reaction force acting point of the leg on the basis of the combination of contact or no contact at respective places, which is indicated by ground contact detection signals of the first and the second ground contact sensors provided at two places (the place directly below the ankle joint and the place directly below the metatarsophalangeal joint) of the sole of the foot of each leg. This arrangement allows the horizontal position of a floor reaction force acting point to be estimated without using a data table, or map data or the like. Moreover, the vertical distance from the ankle joint to a ground contact surface (floor surface) of each leg in contact with the ground is successively grasped in the first step, thereby estimating the position vertically apart downward from the ankle joint by that vertical distance as the vertical position of the floor reaction force acting point, so that it is possible to estimate the vertical position of a floor reaction force acting point without using a data table, or map data or the like.

Thus, according to the method of estimating a floor reaction force acting point in accordance with the present invention, the position of a floor reaction force acting point can be grasped in real time by a relatively simple technique without using a plurality of types of correlation data.

The method of estimating a floor reaction force acting point in accordance with the present invention makes it possible to grasp the position of the center of gravity, the position of an ankle joint, and the position of a metatarsophalangeal joint by detecting, for example, the inclination angle of a body by a gyro-sensor or an acceleration sensor and by detecting the bending angle of a joint of each leg by a potentiometer or the like, and then by using the detected inclination angle of the body, the detected bending angle of the joint of the leg, and a rigid link model representing a biped mobile body in the form of a rigid linkage assembly.

According to the method of estimating a floor reaction force acting point in accordance with the present invention, basically, if a ground contact detection signal of the first ground contact sensor of each leg is a signal indicating contact with the ground and a ground contact detection signal of the second ground contact sensor of the leg is a signal indicating no contact with the ground, then the horizontal position of the ankle joint of the leg may be estimated as the horizontal position of a floor reaction force acting point of the leg, or if a ground contact detection signal of the first ground contact sensor of each leg is a signal indicating no contact with the ground and a ground contact detection signal of the second ground contact sensor of the leg is a signal indicating contact with the ground, then the horizontal position of the metatarsophalangeal joint of the leg may be estimated as the horizontal position of a floor reaction force acting point of the leg, or if ground contact detection signals of both the first ground contact sensor and the second ground contact sensor of each leg are signals indicating contact with the ground, then the horizontal position of the center of gravity may be estimated as the horizontal position of a floor reaction force acting point of the leg.

However, depending on the motion mode or the like of a biped walking mobile body, if ground contact detection signals of both the first ground contact sensor and the second ground contact sensor of each leg are signals indicating contact with the ground, i.e., the place directly below the ankle joint (the sole on the heel side) and the place directly below the metatarsophalangeal joint (the sole on the toe side) are in contact with the ground (including contact that hardly produces a load), then a situation may occur in which the position of the center of gravity of the biped walking mobile body is behind the position of the ankle joint of the leg in contact with the ground or before the position of the metatarsophalangeal joint in the advancing direction of the biped walking mobile body. In such a case, the horizontal position of the center of gravity deviates from the ground contact surface of the leg. Hence, if the horizontal position of the center of gravity is estimated as the horizontal position of a floor reaction force acting point, then the estimating position will be inaccurate with respect to the horizontal position of a normal floor reaction force acting point that should exist within a ground contact surface of the leg. Further, if the center of gravity of the biped walking mobile body exists behind the position of the ankle joint of the leg in contact with the ground, then the floor reaction force related to the leg is generally concentrated on a place adjacent to the heel of the foot of the leg (that is, a place in the vicinity of the first ground contact sensor). Further, if the center of gravity of the biped walking mobile body exists before the position of the metatarsophalangeal joint of the foot of the leg in contact with the ground, then the floor reaction force related to the leg is generally concentrated on a place adjacent to the toe of the leg (that is, a place in the vicinity of the second ground contact sensor).

Therefore, according to the method of estimating a floor reaction force acting point in accordance with the present invention, to estimate the horizontal position of the floor reaction force acting point in the second step, on each leg in contact with the ground, preferably, if a ground contact detection signal of the first ground contact sensor of each leg is a signal indicating contact with the ground and if a ground contact detection signal of the second ground contact sensor of the leg is a signal indicating no contact with the ground, then the horizontal position of the ankle joint of the leg is estimated as the horizontal position of a floor reaction force acting point of the leg, or if a ground contact detection signal of the first ground contact sensor of each leg is a signal indicating no contact with the ground and if a ground contact detection signal of the second ground contact sensor of the leg is a signal indicating contact with the ground, then the horizontal position of the metatarsophalangeal joint of the leg is estimated as the horizontal position of a floor reaction force acting point of the leg, or if ground contact detection signals of both the first ground contact sensor and the second ground contact sensor of each leg are signals indicating contact with the ground and if the position of the center of gravity is behind the position of the ankle joint of the leg in the advancing direction of the biped walking mobile body, then the horizontal position of the ankle joint of the leg is estimated as the horizontal position of a floor reaction force acting point of the leg, or if ground contact detection signals of both the first ground contact sensor and the second ground contact sensor of each leg are signals indicating contact with the ground and if the position of the center of gravity is before the position of the metatarsophalangeal joint of the leg in the advancing direction of the biped walking mobile body, then the horizontal position of the metatarsophalangeal joint of the leg is estimated as the horizontal position of a floor reaction force acting point of the leg, or if ground contact detection signals of both the first ground contact sensor and the second ground contact sensor of each leg are signals indicating contact with the ground and if the position of the center of gravity is between the position of the ankle joint of the leg and the position of the metatarsophalangeal joint in the advancing direction of the biped walking mobile body, then the horizontal position of the center of gravity is estimated as the horizontal position of a floor reaction force acting point of the leg.

With this arrangement, the accuracy of estimating the horizontal position of a floor reaction force acting point can be enhanced independently of the motion mode or the like of the biped walking mobile body.

Further, according to the method of estimating a floor reaction force acting point in accordance with the present invention, regarding the estimation of the vertical position of a floor reaction force acting point, the vertical distance from the ankle joint to a ground contact surface of each leg when the biped walking mobile body is in, for example, an upright stationary state, is measured and retained in a memory beforehand, and when the vertical distance from the ankle joint to the ground contact surface of each leg in contact with the ground is grasped in the first step, the vertical distance retained in the memory is grasped as the vertical distance from the ankle joint to the ground contact surface of each leg in contact with the ground. The upright stationary state of the biped walking mobile body more technically means a state wherein the biped walking mobile body is standing with both legs thereof and its body stretched substantially in the vertical direction and with substantially entire surfaces of the soles of the feet of both legs in contact with the ground.

More specifically, according to the knowledge of the inventors of the present application, the vertical distance from the ankle joint to the ground contact surface of the leg in contact with the ground generally does not change much while the biped walking mobile body is in a motion, such as walking on a level ground, and will be approximately almost equal to the vertical distance from the ankle joint to the ground contact surface of each leg while the biped walking mobile body is in the upright stationary state. Hence, the vertical position of a floor reaction force acting point can be easily estimated by measuring and retaining in a memory beforehand the vertical distance from the ankle joint to the ground contact surface of each leg in the upright stationary state, and by grasping the vertical distance retained in the memory as the vertical distance from the ankle joint to the ground contact surface of the leg in contact with the ground while the biped walking mobile body is in motion.

To estimate the vertical position of a floor reaction force acting point with even higher accuracy, preferably, the vertical distance from the ankle joint to the ground contact surface of each leg and the vertical distance from the metatarsophalangeal joint to the ground contact surface of the leg while the biped walking mobile body is in the upright stationary state are measured and retained in a memory beforehand as a first basic vertical distance and a second basic vertical distance, respectively, and when the vertical distance from the ankle joint to the ground contact surface of each leg in contact with the ground is grasped in the first step, if the position of the center of gravity is behind the position of the metatarsophalangeal joint of the leg in the advancing direction of the biped walking mobile body, then the first basic vertical distance is grasped as the vertical distance from the ankle joint to the ground contact surface of the leg, or if the position of the center of gravity is before the position of the metatarsophalangeal joint in the advancing direction of the biped walking mobile body, then the vertical distance between the ankle joint and the metatarsophalangeal joint of the leg is determined and then the value obtained by adding the second basic vertical distance to the determined vertical distance is grasped as the vertical distance from the ankle joint to the ground contact surface of the leg.

More specifically, if the position of the center of gravity is behind the position of the metatarsophalangeal joint of a leg in the advancing direction of the biped walking mobile body, then at least bottom surface of the heel of the foot of the leg is in contact with the ground, so that the vertical distance from the ankle joint to the ground contact surface of the leg in contact with the ground while the biped walking mobile body is in motion is substantially equal to the first basic vertical distance. Further, if the position of the center of gravity is before the position of the metatarsophalangeal joint of the leg in the advancing direction of the biped walking mobile body, then the foot of the leg is normally in contact with the ground at a place adjacent to its toe (a place near the metatarsophalangeal joint), whereas its heel is floating. In this case, the vertical distance from a foot joint of the leg to the ground contact surface is substantially equal to the value obtained by adding the second basic vertical distance to the vertical distance between the foot joint and the metatarsophalangeal joint. In this case, the vertical distance between the foot joint and the metatarsophalangeal joint can be determined from the positions of those joints grasped in the first step.

Thus, by grasping the vertical distance from the ankle joint to the ground contact surface of a leg according as whether the position of the center of gravity is behind or before the position of the metatarsophalangeal joint in the advancing direction of the biped walking mobile body, as described above, the accuracy of the vertical distance can be enhanced. As a result, the accuracy of an estimated value of the vertical position of a floor reaction force acting point can be further enhanced.

Next, a method of estimating a joint moment of a biped walking mobile body in accordance with the present invention is a method of estimating a moment acting on at least one joint of each leg of a biped walking mobile body by using an estimated value of the position of a floor reaction force acting point successively determined by the floor reaction force acting point estimating method according to the present invention described above. And this joint moment estimating method includes a step for successively estimating the floor reaction force of each leg, which is in contact with the ground, of the biped walking mobile body by using at least a detection output of an acceleration sensor attached to a body of the biped walking mobile body to detect the acceleration of a predetermined part of the body of the biped walking mobile body and a detection output of a body inclination sensor attached to the body to detect an inclination angle of the body, and a step for successively grasping the inclination angle of each rigid corresponding part of a biped walking mobile body that corresponds to each rigid body of a rigid link model representing the biped walking mobile body in the form of a link assembly of a plurality of rigid bodies, the acceleration of the center of gravity of the rigid corresponding part, and the angular acceleration of the rigid corresponding part by using at least detection outputs of the body inclination sensor and an angle sensor attached to a joint to detect the bending angle of a joint of each leg of the biped walking mobile body, wherein the moment acting on at least one joint of each leg of the biped walking mobile body is estimated on the basis of an inverse dynamics model by using an estimated value of the floor reaction force, an estimated value of the position of the floor reaction force acting point, an inclination angle of the aforesaid each rigid corresponding part, an acceleration of the center of gravity of the rigid corresponding part and an angular acceleration of the rigid corresponding part, the weight and size of each rigid corresponding part determined in advance, the position of the center of gravity of each rigid corresponding part in the rigid corresponding part determined in advance, and an inertial moment of each rigid corresponding part determined in advance.

According to the joint moment estimating method in accordance with the present invention, although it will be discussed in detail later, successively detecting the acceleration of a predetermined part (e.g., the waist) of a body (torso) of a biped walking mobile body by an acceleration sensor and also successively detecting the inclination angle of the body by a body inclination sensor allow the floor reaction force acting on each leg in contact with the ground to be successively estimated by using the detection outputs (detected values). Further, successively detecting the bending angle of a joint of each leg by an angle sensor in addition to detecting the inclination angle of the body by a body inclination sensor makes it possible to successively grasp the inclination angle (this indicates the mutual posture relationship among rigid corresponding parts) of each rigid corresponding part (thigh, crus, etc.) of a rigid link model representing a biped walking mobile body, the acceleration of the center of gravity of the rigid corresponding part, and the angular acceleration of the rigid corresponding part by using the detection outputs (detected values) of the aforesaid body inclination sensor and the angle sensor. This means that the mutual posture relationship among rigid corresponding parts will be known if the inclination angle of the body and the bending angles of joints of each leg are known, so that the inclination angles of the rigid corresponding parts will be known. Further, the position of the center of gravity of a rigid corresponding part in the rigid corresponding part (the position of the center of gravity of the rigid corresponding part in a coordinate system fixed to each rigid corresponding part) can be determined in advance; therefore, based on this and the mutual posture relationship among the rigid corresponding parts, the position of the center of gravity of each rigid corresponding part (the position relative to a reference point fixed at an arbitrary position (e.g., the waist) of a biped walking mobile body) in the entire biped walking mobile body (in the entire rigid link model) can be known. And, the acceleration of the center of gravity can be grasped as the second-order differentiation value of the position of the center of gravity of each rigid corresponding part. Further, if the inclination angle of each rigid corresponding part is known, then the angular acceleration of each rigid corresponding part can be grasped as the second-order differentiation value thereof.

Further, when the floor reaction force of a biped walking mobile body has been estimated, and the inclination angle of each rigid corresponding part, the acceleration of the center of gravity of the rigid corresponding part, and the angular acceleration of the rigid corresponding part have been grasped, as described above, these pieces of data and the estimated value of a floor reaction force acting point determined by the aforesaid floor reaction force acting point estimating method, the weight and size (especially length) of each rigid corresponding part determined in advance, the position of the center of gravity of each rigid corresponding part in the rigid corresponding part determined in advance, and the inertial moment of each rigid corresponding part determined in advance can be used to estimate the moment acting on a knee joint or a hip joint of each leg on the basis of a publicly known so-called inverse dynamics model. Briefly speaking, the technique based on the inverse dynamics model uses an equation of motion related to the translational motion of the center of gravity of each rigid corresponding part of a biped walking mobile body and an equation of motion related to a rotational motion of the rigid corresponding part (e.g., the rotational motion about the center of gravity of the rigid corresponding part) to determine the moments acting on joints of the biped walking mobile body that correspond to the joints of a rigid link model in order from the one closest to a floor reaction force acting point. Although it will be discussed in detail later, if it is assumed that, for example, each leg is a link assembly having a thigh and a crus as rigid corresponding parts, then the force acting on the knee joint of the leg (the joint reaction force) will be known by applying the acceleration of the center of gravity of the crus, an estimated value of the floor reaction force acting on the leg, and a value of the weight of the crus to the equation of motion related to the translational motion of the center of gravity of the crus of each leg. Furthermore, the moment of the knee joint of the leg can be estimated by applying a joint reaction force acting on the knee joint of the leg, an angular acceleration of the crus of the leg, an estimated position of the floor reaction force acting point of the leg, an estimated value of the floor reaction force of the leg, the position of the center of gravity of the crus in the crus, a data value related to the size (length) of the crus, a value of the inertial moment of the crus, and a value of the inclination angle of the crus to an equation of motion related to a rotational motion of the crus.

In addition, the joint reaction force acting on the hip joint of the leg can be determined by applying an acceleration of the center of gravity of the thigh, a joint reaction force acting on the knee joint of the leg, and a value of the weight of the thigh to an equation of motion related to the translational motion of the center of gravity of the thigh of each leg. Further, the moment of the hip joint of the leg can be estimated by applying joint reaction forces acting on the knee joint and the hip joint, respectively, of the leg, an angular acceleration of the thigh of the leg, a position of the center of gravity of the thigh in the thigh and a data value related to the size (length) of the thigh, a value of the inertial moment of the thigh, and a value of the inclination angle of the thigh to an equation of motion related to the rotational motion of the thigh.

The joint moment estimating method in accordance with the present invention makes it possible to estimate, in real time, the moment acting on a joint of a leg by relatively simple arithmetic processing by using an estimated value of the position of a floor reaction force acting point estimated according to the floor reaction force acting point estimating method in accordance with the present invention described above so as to estimate the moment acting on a joint of a leg, thus obviating the need for preparing multiple types of correlation data beforehand or for attaching a relatively large sensor or the like to a biped walking mobile body.

BEST MODE FOR CARRYING OUT THE INVENTION

Figure 1:
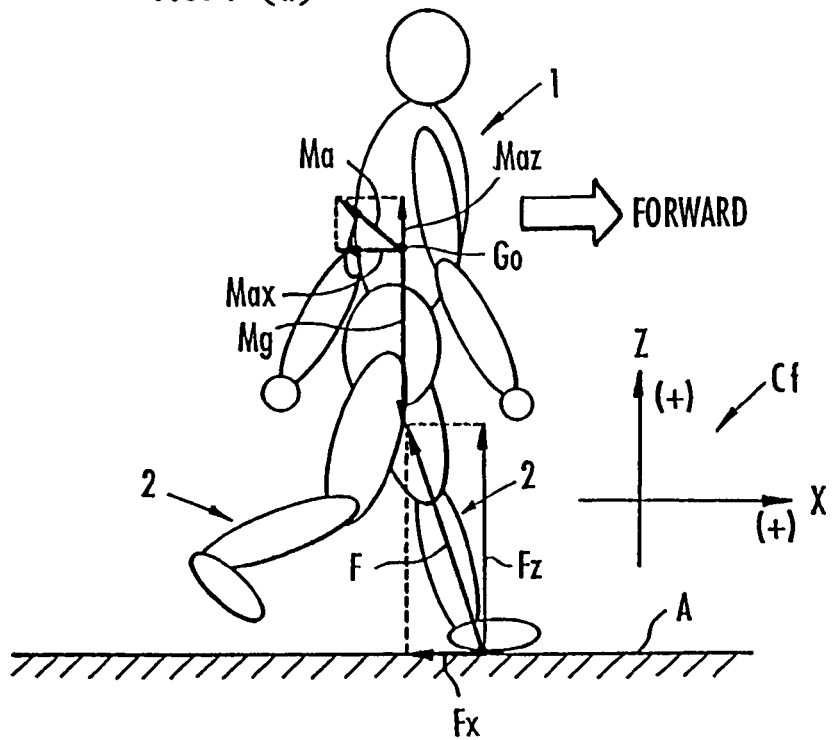
FIGS. 1 (*a*) and (*b*) are diagrams for explaining a basic principle of a method of estimating floor reaction forces in an embodiment of the present invention.
Figure 1:
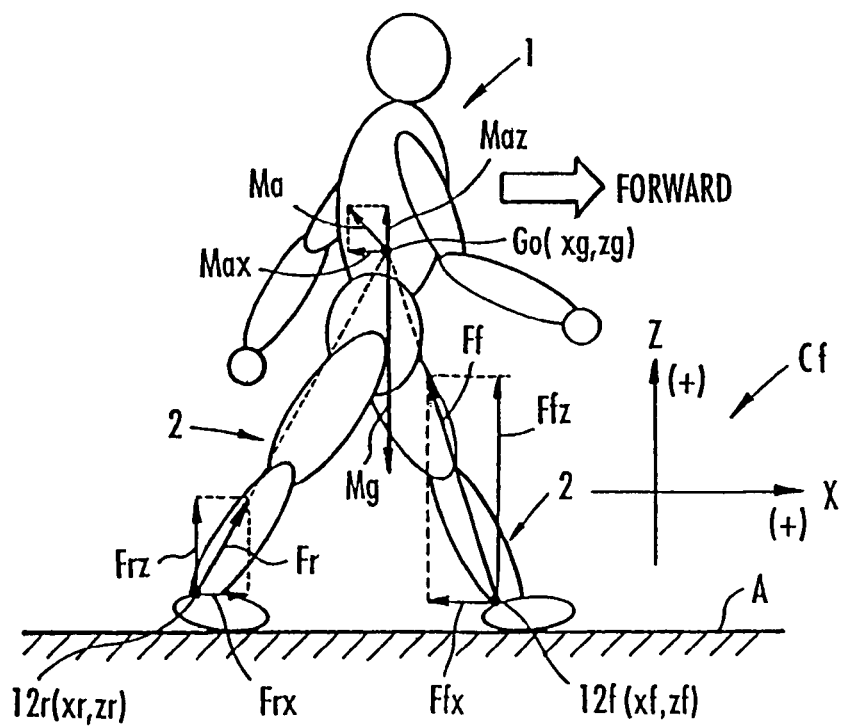

An embodiment to which a method of estimating a floor reaction force acting point and a method of estimating a joint moment in accordance with the present invention will be explained with reference to the accompanying drawings. First, for the convenience of understanding, the basic concept of the technique for estimating floor reaction forces of a biped walking mobile body in the embodiment of the present invention will be explained with reference to FIG. 1. The motional state of a leg of a biped walking mobile body, e.g., the motional state of a leg in a walking mode, comes in a single stance state in which only one leg 2 (the front leg, as observed in the advancing direction of a biped walking mobile body 1 in the figure) of both legs 2 and 2 of the biped walking mobile body 1 is in contact with the ground, as shown in FIG. 1(*a*), and a double stance state in which both legs 2 and 2 are in contact with the ground, as shown in FIG. 1(*b*).

Here, first, in the single stance state, the equation of motion (to be more specific, an equation of motion related to the translational motion of a center of gravity) of the center of gravity of the biped walking mobile body 1 in an absolute coordinate system fixed to the floor on which the biped walking mobile body 1 moves provides a relational expression in which the product of the acceleration of the center of gravity and the weight of the biped walking mobile body 1 is equal to the resultant force of the gravity acting on the center of gravity (=weight of the biped walking mobile body 1×acceleration of gravity) and the floor reaction force acting from the floor to the ground contact portion of the leg 2 in contact with the ground. Specifically, as shown in, for example, FIG. 1 (*a*), if the components of an acceleration a (vector) of a center of gravity G0 of the biped walking mobile body 1 in an X-axis direction (the horizontal direction relative to the advancing direction of the biped walking mobile body 1) and in a Z-axis direction (the vertical direction) are denoted by ax and az, respectively, and the components of a floor reaction force F (vector) related to the leg 2 in contact with the ground (the supporting leg 2) in the X-axis direction and the Z-axis direction are denoted by Fx and Fz, respectively, in an absolute coordinate system Cf fixed to a floor A, then the equation of motion of the center of gravity G0 is represented by Equation (1) given below.

$$^T(Fx, Fz-M \cdot g) = M \cdot {}^T(ax, az) \quad (1)$$

(where M: Weight of the biped walking mobile body, g: Acceleration of gravity)

The parenthesized portions $^T(\,,\,)$ on both sides in Equation (1) mean the vectors of two components. In the present description, the notation of $^T(\,,\,)$ will denote a vector.

Thus, if the acceleration $a={}^T(ax, az)$ of the center of gravity GG0 of the biped walking mobile body 1 is grasped, then the estimated value of the floor reaction force $F={}^T(Fx, Fz)$ can be obtained according to the following Equation (2) by using the acceleration a, the value of the weight M of the biped walking mobile body 1, and the value of the acceleration of gravity g.

$$^T(Fx, Fz) = M \cdot {}^T(ax, az-g) \quad (2)$$

In this case, the weight M necessary to obtain the estimated value of the floor reaction force F can be grasped beforehand by measurement or the like. Although it will be discussed in detail hereinafter, the position and the acceleration a of the center of gravity G0 can be successively grasped by a publicly known technique or the like by using outputs of sensors, such as a sensor for detecting bending angles (rotational angles) of joints of the biped walking mobile body 1, an acceleration sensor, and a gyro sensor.

An equation of motion of the center of gravity of the biped walking mobile body 1 (specifically, an equation of motion related to the translational motion of the center of gravity) in the state wherein both legs are in contact with the ground provides a relational expression in which the product of the acceleration of the center of gravity and the weight of the biped walking mobile body 1 is equal to the resultant force of the gravity acting on the center of gravity (=weight of the biped walking mobile body×acceleration of gravity) and the floor reaction forces acting from the floor to the ground contact portion of each of the two legs 2 and 2 (two floor reaction forces associated with the two legs 2 and 2, respectively). Specifically, as shown in, for example, FIG. 1 (b), if the XZ coordinate components of a floor reaction force Ff related to the leg 2 at the front side with respect to the advancing direction of the biped walking mobile body 1 are denoted by Ffx and Ffz, and the XZ coordinate components of a floor reaction force Fr related to the leg 2 at the rear side are denoted by Frx and Frz, then the equation of motion of the center of gravity G0 is represented by Equation (3) given below.

$$^T(Ffx+Frx, Ffz+Frz-M \cdot g) = M \cdot {}^T(ax, az) \quad (3)$$

The meanings of ax, az, M, and g in Equation (3) are as described above.

Meanwhile, according to the knowledge of the inventors of the present application, the floor reaction forces Ff and Fr related to the legs 2 and 2, respectively, in the double stance state may be considered to generally act toward the center of gravity G0 of the biped walking mobile body 1 from particular parts in the vicinity of the bottom ends of the legs 2 and 2, e.g., the portions of ankle joints 12f and 12r, as shown in FIG. 1 (b). And, at this time, a certain relational expression holds between the positions of the ankle joints 12f and 12r of the legs 2 and 2 relative to the center of gravity G0 and the floor reaction forces Ff and Fr acting on the legs 2 and 2, that is, a relational expression representing a relationship in which the direction of a segment connecting the center of gravity G0 and the ankle joints 12f and 12r of the legs 2 and 2 (the direction of the positional vectors of the ankle joints 12f and 12r relative to the center of gravity G0 ) agrees with the direction of the floor reaction forces Ff and Fr related to the legs 2 and 2.

Specifically, referring to FIG. 1 (b), if the coordinates of the position of the center of gravity G0 in the absolute coordinate system Cf is denoted by (Xg, Zg), the coordinates of the position of the ankle joint 12f of the leg 2 at the front side is denoted by (Xf, Zf), and the coordinates of the position of the ankle joint 12r of the leg 2 at the rear side is denoted by (Xr, Zr), then the above relational expression will be the following equation (4):

$$(Zf-Zg)/(Xf-Xg) = Ffz/Ffx$$

$$(Zr-Zg)/(Xr-Xg) = Frz/Frx \quad (4)$$

Equation (5) given below is derived from the Equation (4) and the above Equation (3):

$$Ffx = M \cdot \{\Delta Xf \cdot (\Delta Zr \cdot ax - \Delta Xr \cdot az - \Delta Xr \cdot g)\} / (\Delta Xf \cdot \Delta Zr - \Delta Xr \cdot \Delta Zf) \quad (5)$$

$$Ffz = M \cdot \{\Delta Zf \cdot (\Delta Zr \cdot ax - \Delta Xr \cdot az - \Delta Xr \cdot g)\} / (\Delta Xf \cdot \Delta Zr - \Delta Xr \cdot \Delta Zf)$$

$$Frx = M \cdot \{\Delta Xr \cdot (-\Delta Zf \cdot ax + \Delta Xf \cdot az + \Delta Xf \cdot g)\} / (\Delta Xf \cdot \Delta Zr - \Delta Xr \cdot \Delta Zf)$$

$$Frz = M \cdot \{\Delta Zr \cdot (-\Delta Zf \cdot ax + \Delta Xf \cdot az + \Delta Xf \cdot g)\} / (\Delta Xf \cdot \Delta Zr - \Delta Xr \cdot \Delta Zf)$$

(where $\Delta Xf = Xf - Xg$,
$\Delta Zf = Zf - Zg$,
$\Delta Xr = Xr - Xg$,
$\Delta Zr = Zr - Zg$)

Accordingly, if the acceleration $a={}^T(ax, az)$ of the center of gravity G0 of the biped walking mobile body 1 is grasped and the positions of the ankle joints 12f, 12r of the legs 2, 2 relative to the center of gravity G0 of the biped walking mobile body 1 (these are denoted by $\Delta Xf$, $\Delta Zf$, $\Delta Xr$, and $\Delta Zr$ in Equation (5)) are grasped, then the estimated values of the floor reaction forces $Ff={}^T(Ffx, Ffz)$ and $Fr={}^T(Frx, Frz)$ of each leg 2 can be obtained according to the above Equation (5) by using the acceleration a, the positions of the ankle joints 12f, 12r, the value of the weight M of the biped walking mobile body 1, and the value of the acceleration of gravity g.

In this case, the weight M necessary to obtain the estimated values of the floor reaction forces Ff and Fr can be grasped beforehand by measurement or the like. Although it will be discussed in detail hereinafter, the acceleration a of the center of gravity G0, the position of the center of gravity G0, and the positions of the ankle joints 12f, 12r relative to the center of gravity G0can be successively grasped by a publicly known technique or the like by using outputs of sensors, such as a sensor for detecting bending angles (rotational angles) of joints of the biped walking mobile body 1, an acceleration sensor, and a gyro sensor.

The embodiments (first and second embodiments) explained below are adapted to estimate the floor reaction force acting point and joint moments of each leg 2 while estimating the floor reaction force of each leg 2 at the same time on the basis of the matters explained above.

The first embodiment in which the present invention has been applied to a human being as a biped walking mobile body will now be explained in detail.

Figure 2:
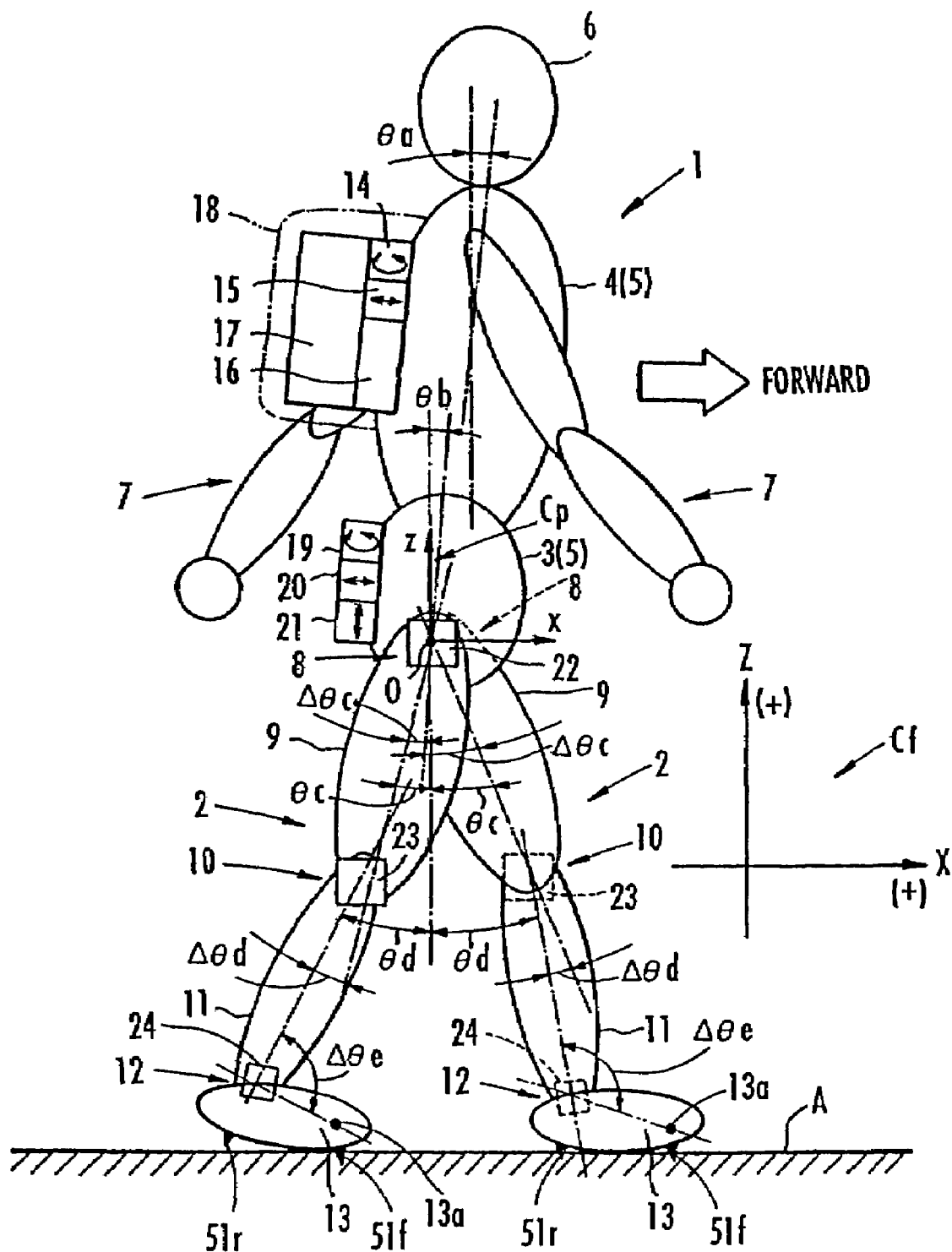
FIG. 2 is a diagram schematically showing a human being as a bipedal walking mobile body and a construction of an apparatus installed on the human being in an embodiment of the present invention.

As schematically shown in FIG. 2, a human being 1 is roughly constructed of a pair of right and left legs 2, 2, a torso 5 composed of a waist 3 and a chest 4, a head 6, and a pair of right and left arms 7, 7. In the torso 5, the waist 3 is connected to the legs 2, 2 through the intermediary of a pair of right and left hip joints 8, 8, and is supported on the two legs 2, 2. The chest 4 of the torso 5 exists on the upper side of the waist 3 such that it can be tilted toward the front of the human being 1 with respect to the waist 3. And, the arms 7, 7 are provided such that they extend from right and left sides of the upper part of the chest 4, and the head 6 is supported on the upper end of the chest 4.

Each of the legs 2 and 2 has a thigh 9 extending from the hip joint 8 and a crus 11 extending from the distal end of the thigh 9 through the intermediary of a knee joint 10, a foot 13 being connected to the distal end of the crus 11 through the intermediary of an ankle joint 12.

In the present embodiment, an apparatus described below is attached to the human being 1 to estimate a floor reaction force acting on each leg 2 of the human being 1 that has such a construction, and the acting point thereof, and also to estimate the moments acting on the knee joints 10 and the hip joints 8.

More specifically, attached to the chest 4 of the torso 5 are a gyro sensor 14 that generates outputs based on angular velocities involved in inclinations of the chest 4 (hereinafter referred to as "the chest gyro sensor 14"), an acceleration sensor 15 that generates outputs based on longitudinal accelerations of the chest 4 (hereinafter referred to as "the chest longitudinal acceleration sensor 15"), an arithmetic processing unit 16 constructed of a CPU, a RAM, a ROM, etc., and a battery 17 that provides a power supply of the arithmetic processing unit 16, etc. In this case, these chest gyro sensor 14, the chest longitudinal acceleration sensor 15, the arithmetic processing unit 16, and the battery 17 are accommodated in a shoulder-bag type housing member 18 secured to, for example, the chest 4, through a belt or the like, which is not shown, and are integrally secured to the chest 4 through the intermediary of the housing member 18.

More technically, the acceleration indicated by an output of the chest longitudinal acceleration sensor 15 is the longitudinal acceleration in the direction of a horizontal section of the chest 4 (the direction orthogonal to the axis of the chest 4), and it is the acceleration in the longitudinal horizontal direction (in the direction of the X-axis of the absolute coordinate system Cf of FIG. 2) in a state wherein the human being 1 is standing upright on a level ground, while in a state wherein the waist 3 or the chest 4 is inclined from the vertical direction (the direction of the Z-axis of the absolute coordinate system Cf of FIG. 2), it is the acceleration in the direction inclined relative to the horizontal direction by an inclination angle relative to the vertical direction of the chest 4.

Further, a gyro sensor 19 that generates outputs based on angular velocities involved in inclinations of the waist 3 (hereinafter referred to as "the waist gyro sensor 19"), an acceleration sensor 20 that generates outputs based on longitudinal accelerations of the waist 3 (hereinafter referred to as "the waist longitudinal acceleration sensor 20"), and an acceleration sensor 21 that generates outputs based on vertical accelerations of the waist 3 (hereinafter referred to as "the waist vertical acceleration sensor 21") are integrally mounted and secured to the waist 3 of the torso 5 through the intermediary of a securing means, such as a belt, which is not shown.

More technically, the waist longitudinal acceleration sensor 20 is a sensor that detects the longitudinal accelerations in the direction of a horizontal section of the waist 3 (the direction orthogonal to the axis of the waist 3), as in the case of the chest longitudinal acceleration sensor 15. More technically, the waist vertical acceleration sensor 21 is a sensor that detects vertical accelerations in the axial direction of the waist 3 (this is orthogonal to the accelerations detected by the waist longitudinal acceleration sensor 20). The waist longitudinal acceleration sensor 20 and the waist vertical acceleration sensor 21 may be integrally constructed by a biaxial acceleration sensor.

Further, attached to the hip joint 8 and the knee joint 10 of each leg 2 are a hip joint angle sensor 22 and a knee joint angle sensor 23 that generate outputs based on bending angles $\Delta\theta c$ and $\Delta\theta d$, respectively, thereof. Regarding the hip joint angle sensor 22, FIG. 2 shows only the hip joint angle sensor 22 related to the hip joint 8 of the leg 2 on the front side (on the right side, as observed in the forward direction from the human being 1); however, another hip joint angle sensor 22 is attached concentrically with the hip joint angle sensor 22 on the front side to the hip joint 8 of the leg 2 on the other side (on the left side, as observed in the forward direction from the human being 1).

These angle sensors 22 and 23 are composed of, for example, potentiometers, and mounted on each leg 2 through the intermediary of a means, such as a band member, which is not shown. Here, in the example of the present embodiment, the bending angle $\Delta\theta c$ detected by each hip joint angle sensor 22 is, more technically, the rotational angle about the hip joint 8 of the thigh 9 of each leg 2 with respect to the waist 3 (about the axis of the hip joint 8 in the lateral direction of the human being 1), this being based on when the posture relationship between the waist 3 and the thigh 9 of each leg 2 indicates a predetermined posture relationship (e.g., the posture relationship in which the axis of the waist 3 and the axis of the thigh 9 are substantially parallel, as in the state wherein the human being 1 is upright and stationary). Similarly, the bending angle $\Delta\theta d$ detected by each knee joint angle sensor 23 is the rotational angle about the knee joint 10 of the crus 11 relative to the thigh 9 (about the axis of the knee joint 10 in the lateral direction of the human being 1), this being based on when the posture relationship between the thigh 9 and the crus 11 of each leg 2 indicates a predetermined posture relationship (e.g., the posture relationship in which the axis of the thigh 9 and the axis of the crus 11 are substantially parallel). The axis of the thigh 9 is a straight line connecting the center of the joint (hip joint 8) at one end of the thigh 9 and the center of the joint (knee joint 10) at the other end thereof. Similarly, the axis of the crus 11 is a straight line connecting the centers of the joints (the knee joint 10 and the ankle joint 12) at both ends thereof.

Furthermore, at two places on the bottom surface of the foot 13 of each leg 2, ground contact sensors 51$f$ and 51$r$ for detecting contact or no contact of the places with the ground are installed. More specifically, the ground contact sensors 51$f$ and 51$r$ are attached to the shoe sole of each foot 13, the shoe being worn by the human being 1. In this case, the ground contact sensors 51$f$ and 51$r$ of each foot 13 are provided longitudinally apart from each other at a place directly below the metatarsophalangeal joint 13$a$ (indicated by a dark dot in FIG. 2, hereinafter being referred to as "the MP joint 13$a$") of the foot 13 and a place directly below the ankle joint 12, respectively, and they output ON/OFF signals on the basis of contact or no contact of the respective places with the ground. More technically, the MP joint 13a is the joint of the thumb root of the foot 13. The place directly below the MP joint 13a means, more precisely, a place vertically below the MP joint 13a in a state wherein the human being 1 is in a substantially upright posture (upright stationary state) with substantially the entire bottom surface of the foot 13 in contact with a flat floor surface. The same applies to the place directly below the ankle joint 12. In the following explanation, the ground contact sensor 51f may be referred to as the directly below MP ground contact sensor 51f, and the ground contact sensor 51r, as the directly below ankle ground contact sensor 51r.

The aforesaid sensors 14, 15, 19 to 23, 51f, and 51r are connected to the arithmetic processing unit 16 through signal lines, which are not shown, to input their outputs to the arithmetic processing unit 16. In association with the method of estimating floor reaction force acting points in accordance with the present invention, the directly below MP ground contact sensor 51f and the directly below ankle ground contact sensor 51r correspond to the second ground contact sensor and the first ground contact sensor, respectively. Further, in association with the joint moment estimating method in accordance with the present invention, the sensors 14, 15, 19 and 20 mean body inclination sensors for detecting the inclination angles of the body of the human being 1 as a biped walking mobile body, and the sensors 20 and 21 mean sensors for detecting the accelerations of the waist 3 as a particular part of the human being 1 (the biped walking mobile body).

In FIG. 2, the components marked with reference numerals 24 are ankle joint angle sensors that output signals based on the bending angles of the ankle joint 12 of each leg 2, and are related to the second embodiment, which will be discussed later. In the present embodiment (the first embodiment), the ankle joint angle sensors 24 are unnecessary and not actually provided.

Figure 3:
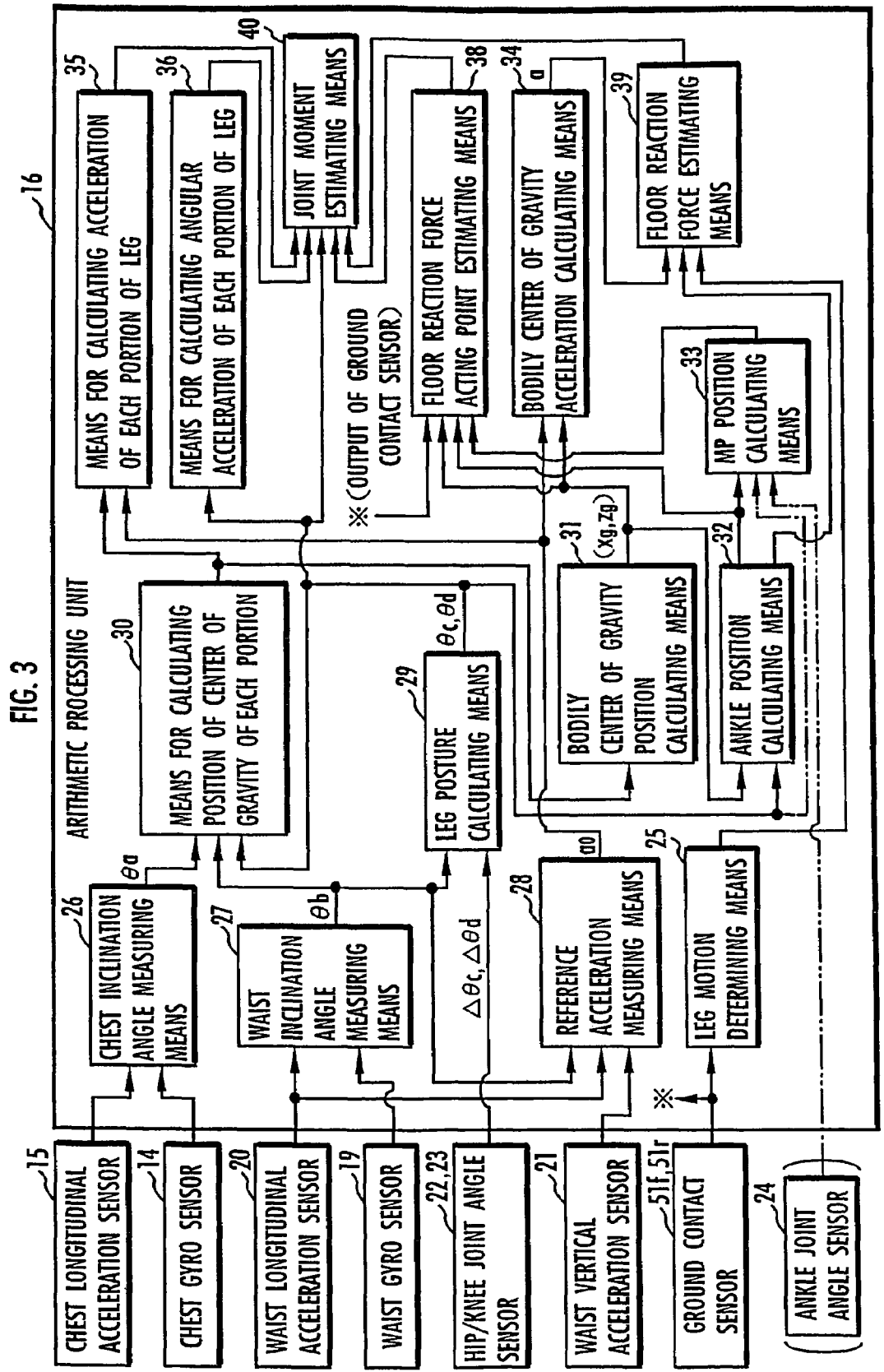
FIG. 3 is a block diagram for explaining the functions of an arithmetic processing unit installed in the apparatus shown in FIG. 2.

The arithmetic processing unit 16 is equipped with the functional means shown in FIG. 3. In FIG. 3, the parenthesized portion (the portion of the ankle joint angle sensor 24) and the portion indicated by the chain double-dashed line are related to the second embodiment to be discussed later, and these parenthesized portion and the portion indicated by the chain double-dashed line are unnecessary. Therefore, in the following explanation of the arithmetic processing unit 16 in the present embodiment, nothing related to these parenthesized portion and the portion enclosed by the chain double-dashed line will be referred to.

As shown in FIG. 3, the arithmetic processing unit 16 in the present embodiment is equipped with a leg motion determining means 25 that uses the detection data of the ground contact sensors 51r and 51f so as to determine whether the motion states of the legs 2, 2 of the human being 1 are in the single stance state (the state shown in FIG. 1 (*a*)) or the double stance state (the state shown in FIG. 1 (*b*)). The arithmetic processing unit 16 is further provided with a chest inclination angle measuring means 26 that uses the detection data of the chest longitudinal acceleration sensor 15 and the chest gyro sensor 14 thereby to measure an inclination angle θa in an absolute coordinate system Cf of the chest 4 (specifically, the inclination angle θa with respect to a vertical direction: refer to FIG. 2) and a waist inclination angle measuring means 27 that uses the detection data of the waist longitudinal acceleration sensor 20 and the waist gyro sensor 19 so as to measure an inclination angle θb in an absolute coordinate system Cf of the waist 3 (specifically, the inclination angle θb relative to a vertical direction: refer to FIG. 2).

The arithmetic processing unit 16 is further provided with a reference acceleration measuring means 28 that uses the detection data of the waist longitudinal acceleration sensor 20 and the waist vertical acceleration sensor 21 and the data of the inclination angle θb of the waist 3 measured by the waist inclination angle measuring means 27 so as to determine an acceleration (translational acceleration) $a_0 = {}^T(a_0x, a_0z)$ in the absolute coordinate system Cf at an origin O of a bodily coordinate system Cp (the xz-coordinate system in FIG. 2) set at the waist 3, as shown in FIG. 2, as the reference point of the human being 1 in the present embodiment. Here, the bodily coordinate system Cp is, to be more specific, a coordinate system, for example, that has a midpoint of a line connecting centers of the right and left hip joints 8, 8, respectively, of the human being 1 defined as the origin O, a vertical direction being defined as a z-axis direction, and a forward horizontal direction of the human being 1 defined as an x-axis direction. The directions of the three axes are the same as those in the aforesaid absolute coordinate system Cf.

The arithmetic processing unit 16 is further provided with a leg posture calculating means 29 that uses detection data of the hip joint angle sensor 22 and the knee joint angle sensor 23 of each leg 2 and the data of the inclination angle θb of the waist 3 obtained by the waist inclination angle measuring means 27 thereby to determine inclination angles θc and θd of the thigh 9 and the crus 11, respectively, of each leg 2 in an absolute coordinate system Cf (specifically, inclination angles θc and θd relative to a vertical direction: refer to FIG. 2).

The arithmetic processing unit 16 is further provided with a means 30 for calculating the position of the center of gravity of each portion by using data of an inclination angle θa of the chest 4, an inclination angle θb of the waist 3, and an inclination angle θc of the thigh 9 and an inclination angle θd of the crus 11 of each leg 2, which are obtained by the chest inclination angle measuring means 26, the waist inclination angle measuring means 27, and the leg posture calculating means 29, to determine the position of the center of gravity of each rigid corresponding part of the human being 1 associated with a rigid link model to be discussed hereinafter (specifically, the position of the center of gravity of each rigid corresponding part in the bodily coordinate system Cp), a bodily center of gravity position calculating means 31 that uses the data of the position of the center of gravity of the aforesaid rigid corresponding part so as to determine the position of the center of gravity of the entire human being 1 in the bodily coordinate system Cp, an ankle position calculating means 32 that uses the data of the inclination angles θc and θd of each of the thigh 9 and the crus 11 of each leg 2 obtained by the leg posture calculating means 29 so as to determine the position of the ankle joint 12 of each leg 2 in the bodily coordinate system Cp, and further uses the data of the position of the center of gravity G0 of the entire human being 1 (refer to FIG. 1: hereinafter referred to as "the bodily center of gravity G0") obtained by the bodily center of gravity position calculating means 31 to determine the position of the ankle joint 12 of the leg 2 relative to the bodily center of gravity G0 (specifically, ΔXf, ΔZf, ΔXr and ΔZr in the above Equation (5)), an MP position calculating means 33 that uses the data of the position of the ankle joint 12 (the position in the bodily coordinate system Cp) obtained by the ankle position calculating means 32 to determine the position (specifically, the position in the x-axis direction) of an MP joint 13a of the foot 13 of each leg 2 in the bodily coordinate system Cp, and a bodily center of gravity acceleration calculating means 34 that uses the data of the position of the bodily center of gravity G0 obtained by the bodily center of gravity position calculating means 31 and the data of the acceleration $a_0$ at the origin O of the bodily coordinate system Cp obtained by the reference acceleration measuring means 28 thereby to determine an acceleration $a = ^T(ax, az)$ (refer to FIG. 1) of the bodily center of gravity G0 in the absolute coordinate system Cf.

The arithmetic processing unit 16 is further provided with a means 35 for calculating the acceleration of each portion of a leg by using the data of the position of the center of gravity of each rigid corresponding part of the human being 1 (specifically, the position of the center of gravity of a rigid corresponding part related to the leg 2) obtained by the means 30 for calculating the position of the center of gravity of each portion and the data of the acceleration $a_0$ at the origin O of the bodily coordinate system Cp obtained by the reference acceleration measuring means 28 so as to determine the acceleration (translational acceleration) of the center of gravity of the thigh 9 and the crus 11 of each leg 2 in the absolute coordinate system Cf, a means 36 for calculating the angular acceleration of each portion of a leg by using the data of the inclination angles θc and θd of the thigh 9 and the crus 11 of each leg 2 obtained by the leg posture calculating means 29 to determine the angular accelerations of the thigh 9 and the crus 11 of the legs 2, 2 in the absolute coordinate system Cf, and a floor reaction force acting point estimating means 38 for estimating the position of a floor reaction force acting point of each leg 2 in contact with the ground on the basis of the bodily center of gravity G0, the positions of the ankle joint 12 and the MP joint 13a (the positions in the bodily coordinate system Cp) determined by the bodily center of gravity position calculating means 31, the ankle position calculating means 32, and the MP position calculating means 33, respectively, and detection outputs of the ground contact sensors 51f and 51r of each leg 2.

The arithmetic processing unit 16 is further provided with a floor reaction force estimating means 39 for determining the estimated value of a floor reaction force acting on each leg 2 by using the data of the acceleration a of the bodily center of gravity determined by the bodily center of gravity acceleration calculating means 34, the data of the position of the ankle joint 12 of each leg 2 relative to the bodily center of gravity G0 determined by the ankle position calculating means 32, and the data of the determination result of the motion state of the leg 2 given by the leg motion determining means 25, and a joint moment estimating means 40 for estimating moments acting on the knee joint 10 and the hip joint 8 of each leg 2 by using this data of the estimated value of the floor reaction force, the data of the accelerations of the centers of gravity of the thigh 9 and the crus 11 of each leg 2 obtained by the means 35 for calculating the acceleration of each portion of a leg, the data of the angular accelerations of the thigh 9 and the crus 11 of each leg 2 obtained by the means 36 for calculating the angular acceleration of each portion of a leg, the data of the estimated position of a floor reaction force acting point obtained by the floor reaction force acting point estimating means 38, and the data of the inclination angles θc and θd of the thigh 9 and the crus 11, respectively, of each leg 2 obtained by the leg posture calculating means 29.

An operation of the present embodiment will be explained in combination with more detailed description of the processing by each means of the aforementioned arithmetic processing unit 16.

In the present embodiment, when, for example, the human being 1 performs a motion of the legs 2, such as walking, if a power switch, not shown, of the arithmetic processing unit 16 is turned on while both legs 2 and 2 are in contact with a floor (while both feet 13 and 13 are in contact with the ground), then processing is successively carried out by the arithmetic processing unit 16 at a predetermined cycle time, as explained below, thereby successively determining estimated values or the like of floor reaction forces acting on each leg 2.

More specifically, the arithmetic processing unit 16 first executes the processing of the leg motion determining means 25. In the processing of the leg motion determining means 25, ON/OFF of the ground contact sensors 51f and 51r of each leg 2 is determined for each cycle time described above. And, if at least one of the ground contact sensors 51f and 51r of one leg 2 outputs an ON signal (the place of one of the ground contact sensors 51f and 51r is in contact with the ground) and if at least one of the ground contact sensors 51f and 51r of the other leg 2 outputs the ON signal, then it is determined that the motion mode of the legs 2, 2 of the human being 1 is the double stance state shown in FIG. 1 (b) mentioned above. Further, if at least one of the ground contact sensors 51f and 51r of one leg 2 outputs the ON signal and if none of the ground contact sensors 51f and 51r of the other leg 2 output the ON signal (the places of both ground contact sensors 51f and 51r are not in contact with the ground), then it is determined that the motion mode of the legs 2, 2 of the human being 1 is the single stance state shown in FIG. 1 (a) mentioned above.

Whether it is the single stance state or the double stance state may be determined solely by the detection signals of the ground contact sensors 51f and 51r as described above. During a transition between the single stance state and the double stance state, the determination may be performed by considering also a change or the like in detection output of the waist vertical acceleration sensor 21.

In parallel to the processing of the leg motion determining means 25 as described above, the arithmetic processing unit 16 carries out the processing of the chest inclination angle measuring means 26 and the waist inclination angle measuring means 27. In this case, the processing by the chest inclination angle measuring means 26 successively determines the inclination angle θa of the chest 4 in the absolute coordinate system Cf at each cycle time mentioned above by a publicly known technique based on the so-called Kalman filter processing, using the detection data of the longitudinal accelerations of the chest 4 and the angular velocity of the chest 4 received from the chest longitudinal acceleration sensor 15 and the chest gyro sensor 14. Similarly, the processing by the waist inclination angle measuring means 27 successively determines the inclination angle θb of the waist 3 in the absolute coordinate system Cf by using the Kalman filter processing from the detection data of the longitudinal accelerations of the waist 3 and the angular velocity of the waist 3 received from the waist longitudinal acceleration sensor 20 and the waist gyro sensor 19, respectively. Here, the inclination angles θa and θb of the chest 4 and the waist 3, respectively, in the absolute coordinate system Cf denote inclination angles with respect to, for example, the vertical direction (gravitational direction) in the present embodiment.

The inclination angles of the chest 4 and the waist 3 can be alternatively determined by, for example, integrating the detection data of angular velocities obtained by the gyro sensors 14 and 19. However, performing the Kalman filter processing, as in the present embodiment, allows the inclination angles θa and θb of the chest 4 and the waist 3 to be measured with high accuracy.

Next, the arithmetic processing unit 16 performs processing of the leg posture calculating means 29 and the processing of the reference acceleration measuring means 28.

In the processing implemented by the leg posture calculating means 29, the inclination angles θc and θd (inclination angles with respect to the vertical direction: refer to FIG. 2) of the thigh 9 and the crus 11 of each leg 2 are determined at each cycle time, as described below. The inclination angle θc of the thigh 9 of each leg 2 is calculated according to Equation (6) given below on the basis of the current value of the detection data of the bending angle Δθc of the hip joint 8 obtained by the hip joint angle sensor 22 attached to the leg 2 and the current value of the inclination angle θb of the waist 3 determined by the waist inclination angle measuring means 27:

$$\theta c = \theta b + \Delta\theta c \quad (6)$$

where the inclination angle θb of the waist 3 takes a negative value if the waist 3 inclines with respect to the vertical direction such that an upper end portion of the waist 3 juts out farther to the front side of the human being 1 than a lower end portion thereof; and the bending angle Δθc of the hip joint 8 takes a positive value if the thigh 9 inclines with respect to the axis of the waist 3 such that a lower end portion of the thigh 9 juts out toward the front side of the human being 1.

Furthermore, the inclination angle θd of the crus 11 of each leg 2 is calculated according to Equation (7) given below on the basis of the current value of the inclination angle θc of the thigh 9 determined as described above and the current value of the detection data of the bending angle Δθd of the knee joint 10 obtained by the knee joint angle sensor 23 attached to the leg 2:

$$\theta d = \theta c - \Delta\theta d \quad (7)$$

where the bending angle of the knee joint 10 takes a positive value if the crus 11 inclines toward the rear side of the thigh 9 with respect to the axis of the thigh 9.

In the processing of the reference acceleration measuring means 28, the acceleration $a_0 = {}^T(a_0x, a_0z)$ in the absolute coordinate system Cf of the origin O of the bodily coordinate system Cp is determined as described below. If the current value of the detection data of a longitudinal acceleration of the waist 3 obtained from the waist longitudinal acceleration sensor 20 is denoted by $a_p$, and the current value of the detection data of the vertical acceleration of the waist 3 obtained from the waist vertical acceleration sensor 21 is denoted by $a_q$, then the acceleration $a_0 = {}^T(a_0x, a_0z)$ in the absolute coordinate system Cf is determined according to Equation (8) given below from the detection data $a_p$ and $a_q$ and the current value of the inclination angle θb of the waist 3 obtained by the waist inclination angle measuring means 27:

$$\begin{aligned} a_0 &= {}^T(a_0x, a_0z) \\ &= {}^T(a_p \cdot \cos\theta b - a_q \cdot \sin\theta b, a_p \cdot \sin\theta b + \\ &\quad a_q \cdot \cos\theta b - g) \end{aligned} \quad (8)$$

The arithmetic processing unit 16 then carries out the processing of the means 30 for calculating the position of the center of gravity of each portion to determine the position of the center of gravity of each rigid corresponding part of the human being 1 in the bodily coordinate system Cp (the position relative to the origin of the bodily coordinate system Cp), using a rigid link model explained below.

Figure 4:
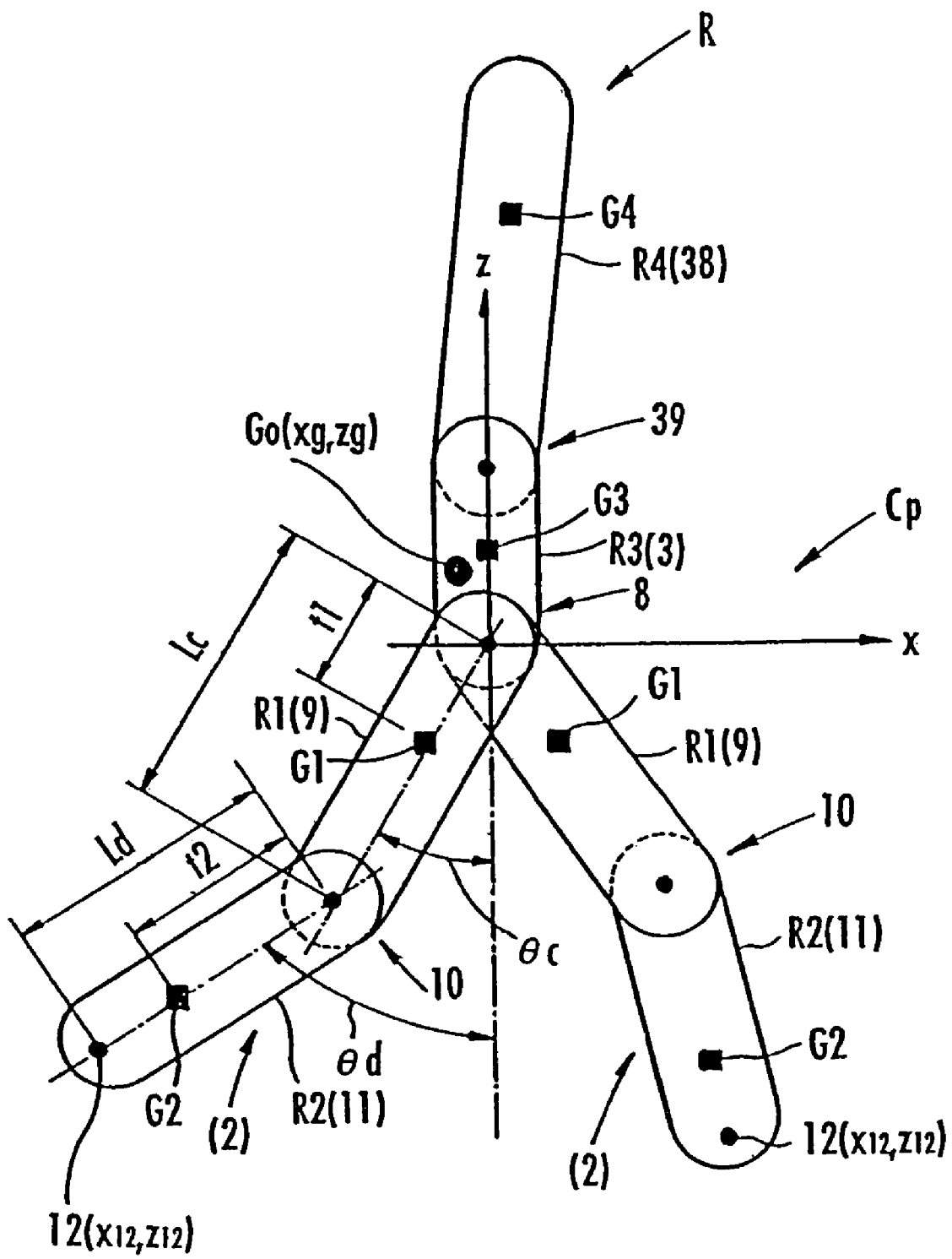
FIG. 4 is a diagram showing a rigid link model used for processing of the arithmetic processing unit shown in FIG. 3.

As shown in FIG. 4, a rigid link model R used in the present embodiment is a model representing the human being 1 by connecting rigid bodies R1, R1 corresponding to the thighs 9 of the respective legs 2, rigid bodies R2, R2 corresponding to the cruses 11, a rigid body R3 corresponding to the waist 3, and a rigid body R4 corresponding to a portion 38 combining the chest 4, the arms 7, 7, and the head 6 (hereinafter referred to as "the body 38"). In this case, the connection of the respective rigid bodies R1 and the rigid body R3 and the connection of the rigid bodies R1 and the rigid bodies R2 correspond to the hip joints 8 and the knee joints 10, respectively. In addition, the connection of the rigid body R3 and the rigid body R4 provides a tilt supporting point 39 of the chest 4 with respect to the waist 3.

In the present embodiment, the positions of the centers of gravity G1, G2, G3 and G4 of the rigid corresponding parts (the thighs 9 and the cruses 11 of the respective legs 2, the waist 3, and the body 38) of the human being 1 associated with the rigid bodies R1 to R4 of the rigid link model R in the rigid corresponding parts are determined beforehand and stored in a memory, not shown, of the arithmetic processing unit 16.

The positions of the centers of gravity G1, G2, G3 and G4 of the rigid corresponding parts that have been stored and retained in the arithmetic processing unit 16 are the positions in a coordinate system fixed with respect to the rigid corresponding parts. In this case, as examples of data indicating the positions of the centers of gravity G1, G2, G3 and G4 of the rigid corresponding parts, the distances in the axial direction of the rigid corresponding parts from the midpoints of joints at one end of each of the rigid corresponding parts are used. Specifically, for example, the position of the center of gravity G1 of each thigh 9 is indicated as the position at a distance t1 in the axial direction of the thigh 9 from the center of the hip joint 8 of the thigh 9, and the position of the center of gravity G2 of each crus 11 is indicated as the position at a distance t2 in the axial direction of the crus 11 from the center of the knee joint 10 of the crus 11, as shown in FIG. 4. The values of the distances t1 and t2 are determined beforehand and retained in a memory in the arithmetic processing unit 16. The same applies to the positions of the centers of gravity G3 and G4 of other rigid corresponding parts.

Technically speaking, the position of the center of gravity G4 of the body 38 is subject to influences of motions of the arms 7 and 7 included in the body 38. In a walking mode, the arms 7 and 7 are generally positionally symmetrical with respect to the axis of the chest 4, so that the position of the center of gravity G4 of the body 38 does not change much, and becomes substantially the same as the position of the center of gravity G4 of the body 38 in, for example, an upright stationary state.

According to the present embodiment, in addition to the data indicating the positions of the centers of gravity G1, G2, G3 and G4 of the rigid corresponding parts (the thighs 9 and the cruses 11 of the legs 2, the waist 3, and the body 38), the data of weights of the rigid corresponding parts and the data of sizes of the rigid corresponding parts (e.g., data of lengths of the rigid corresponding parts) are determined beforehand and retained in a memory in the arithmetic processing unit 16.

The weight of the crus 11 includes the weight of the foot 13. As described above, the data to be stored and retained in the arithmetic processing unit 16 beforehand may be determined by actual measurement or the like, or may be estimated on the basis of human average statistic data from height and weight of the human being 1. Generally, the positions of the centers of gravity G1, G2, G3 and G4, the weights and sizes of the rigid corresponding parts are correlated with the height and weight of a human being. Based on the correlation, from the height and weight of the human being, the positions of the centers of gravity G1, G2, G3 and G4, the weights, and sizes of the rigid corresponding parts can be estimated with relatively high accuracy.

The means 30 for calculating the position of the center of gravity of each portion uses the data stored and retained beforehand in the arithmetic processing unit 16, as described above, the current values of the inclination angle θa of the chest 4 (=the inclination angle of the body 38) and the inclination angle θb of the waist 3 determined by the chest inclination angle measuring means 26 and the waist inclination angle measuring means 27, respectively, and the current values of the inclination angles θc and θd of the thigh 9 and the crus 11 of each leg 2 determined by the leg posture calculating means 29 so as to determine the positions of the centers of gravity G1, G2, G3 and G4 of the rigid corresponding parts in the bodily coordinate system Cp (the xz-coordinate system shown in FIG. 4) having the origin O fixed on the waist 3.

In this case, the inclination angles θa to θd of the rigid corresponding parts (the thighs 9 and the cruses 11 of the legs 2, the waist 3, and the body 38) have been determined, as described above; therefore, the positions and postures of the rigid corresponding parts in the bodily coordinate system Cp are obtained from the data of the inclination angles θa to θd and the data of the sizes of the rigid corresponding parts. Thus, the positions of the centers of gravity G1, G2, G3 and G4 of the rigid corresponding parts in the bodily coordinate system Cp can be determined.

Specifically, referring to, for example, FIG. 4, regarding the leg 2 positioned on the left side in FIG. 4, the inclination angle of the thigh 9 in the bodily coordinate system Cp (the inclination angle relative to the z-axis direction) is θc (in this case, θc<0 in FIG. 4); hence, the coordinate of the position of the center of gravity G1 of the thigh 9 in the bodily coordinate system Cp is (t1·sin θc, −t1·cos θc). The inclination angle in the bodily coordinate system Cp of the crus 11 is θd (θd<0 in FIG. 4); therefore, if the length of the thigh 9 is denoted by Lc, then the coordinate of the position of the center of gravity G2 of the crus 11 in the bodily coordinate system Cp will be (Lc·sin θc+t2·sin θd, −Lc·cos θc−t2·cos θd). The centers of gravity of the thigh 9 and the crus 11 of the other leg 2, and of the waist 3 and the body 38 are determined in the same manner as described above.

After determining the positions of the centers of gravity G1, G2, G3 and G4 of the rigid corresponding parts in the bodily coordinate system Cp by the means 30 for calculating the position of the center of gravity of each portion, the arithmetic processing unit 16 executes the processing by the bodily center of gravity position calculating means 31 to determine the position (xg, zg) of the bodily center of gravity G0 of the human being 1 in the bodily coordinate system Cp, using the data of the positions of the centers of gravity G1, G2 G2, G3 and G4 of the rigid corresponding parts and the data of the weights of the rigid corresponding parts.

If the position of the center of gravity G3 and the weight of the waist 3 in the bodily coordinate system Cp are denoted by (x3, z3) and m3, respectively, the position of the center of gravity G4 and the weight of the body 38 are denoted by (x4, z4) and m4, respectively, the position of the center of gravity G1 and the weight of the thigh 9 of the leg 2, which is located at left as observed in the advancing direction of the human being 1, are denoted by (x1L, z1L) and m1L, respectively, the position of the center of gravity G2 and the weight of the crus 11 of the leg 2 are denoted by (x2L, z2L) and m2L, respectively, the position of the center of gravity G1 and the weight of the thigh 9 of the leg 2 at right are denoted by (x1R, z1R) and m1R, respectively, the position of the center of gravity G2 and the weight of the crus 11 of the leg 2 are denoted by (x2R, z2R) and m2R, respectively, and the weight of the human being 1 is denoted by M (=m1L+m2L+m1R+m2R+m3+m4), then the position (xg, zg) of the bodily center of gravity G0 of the human being 1 in the bodily coordinate system Cp will be determined by Equation (9) given below:

$$xg = (m1L \cdot x1L + m1R \cdot x1R + m2L \cdot x2L + \\ m2R \cdot x2R + m3 \cdot x3 + m4 \cdot x4)/M \quad (9)$$

$$zg = (m1L \cdot z1L + m1R \cdot z1R + m2L \cdot z2L + \\ m2R \cdot z2R + m3 \cdot z3 + m4 \cdot z4)/M$$

After carrying out the processing of the bodily center of gravity position calculating means 31, the arithmetic processing unit 16 further carries out the processing of the bodily center of gravity acceleration calculating means 34, the processing of the ankle position calculating means 32, and the processing of the MP position calculating means 33.

In this case, in the processing of the bodily center of gravity acceleration calculating means 34, first, the two-level differential value of the position (xg, zg) of the bodily center of gravity G0 in the bodily coordinate system Cp, that is, the acceleration $^T(d^2xg/dt^2, d^2zg/dt^2)$ of the bodily center of gravity G0 with respect to the origin O of the bodily coordinate system Cp, is determined, using the time-series data of the position (xg, zg) of the bodily center of gravity G0 in the bodily coordinate system Cp determined by the bodily center of gravity position calculating means 31 for each cycle time mentioned above. Then, a vector sum of the acceleration $^T(d^2xg/dt^2, d^2zg/dt^2)$ and the acceleration $a_0 = ^T(a_0x, a_0z)$ in the absolute coordinate system Cf of the origin O of the bodily coordinate system Cp determined by the reference acceleration measuring means 28 is determined, thereby determining an acceleration $a = ^T(ax, az)$ of the bodily center of gravity G0 in the absolute coordinate system Cf.

In the processing of the ankle position calculating means 32, first, the position of the ankle joint 12 of each leg 2 in the bodily coordinate system Cp is determined by the same processing as that of the means 30 for calculating the position of the center of gravity of each portion from the current values of the data of the inclination angles θc and θd of the thigh 9 and the crus 11 of each leg 2 determined by the leg posture calculating means 29, the current value of the data of the inclination angle θb of the waist 3 determined by the waist inclination angle measuring means 27, and the data of the sizes (lengths) of the thigh 9 and the crus 11. Specifically, referring to FIG. 4, regarding the leg 2 located on the left side in FIG. 4, if the length of the crus 11 (the length from the center of the knee joint 10 to the center of the ankle joint 12) is denoted by Ld, then the coordinate (x12, z12) of the position of the ankle joint 12 in the bodily coordinate system Cp will be (Lc·sin θc+Ld·sin θd, −Lc·cos θc−Ld·cos θd)(where θc<0, θd<0 in FIG. 4). The same applies to the other leg 2.

Furthermore, the positional vector $^T(x12-xg, z12-zg)$ of the ankle 12 of each leg 2 with respect to the bodily center of gravity G0, that is, ΔXf, ΔZf, ΔXr and ΔZr in the above Equation (5), is determined from the position (x12, z12) in the bodily coordinate system Cp of the ankle joint 12 and the current value of the data of the position (xg, zg) of the bodily center of gravity G0 in the bodily coordinate system Cp determined by the bodily center of gravity position calculating means 31.

Figure 5:
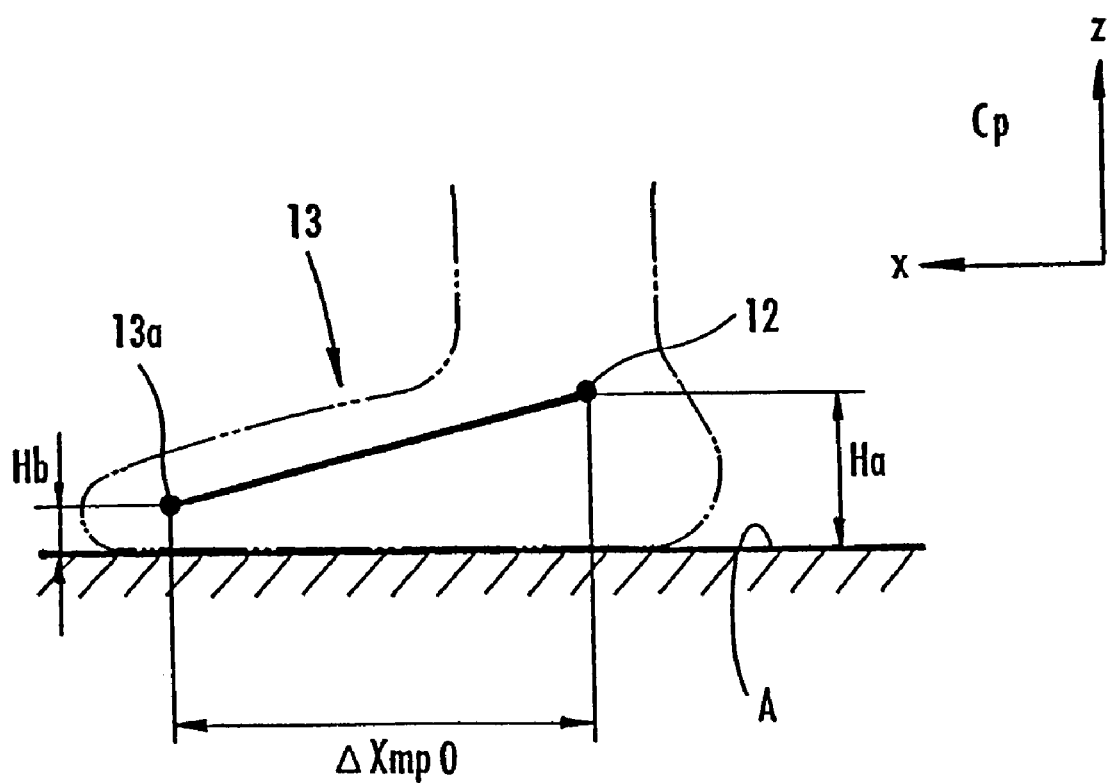
FIG. 5 is a diagram for explaining a technique for calculating the position (horizontal position) of a metatarsophalangeal joint in a first embodiment of the present invention and a technique for grasping the distance from an ankle joint to a ground contact surface, FIGS. 6 (*a*) and (*b*) and FIGS. 7 (*a*) to (*c*) are diagrams for explaining a technique for estimating the horizontal positions of floor reaction force acting points.

In the processing of the MP position calculating means 33, the position of the MP joint 13a (more specifically, the position in the x-axis direction in the bodily coordinate system Cp) is determined as follows. Referring to FIG. 5, in the present embodiment, a distance Δxmp0 in the horizontal direction (the x-axis direction) between the ankle joint 12 and the MP joint 13a in the state wherein the human being 1 is upright stationary (in the state wherein the human being 1 is standing upright on a horizontal floor A, having substantially the entire surface of the sole of the foot 14 of each leg 2 in contact with the floor A) is actually measured beforehand and retained in a memory in the arithmetic processing unit 16. The distance Δxmp0 may be actually measured and retained in a memory separately for each leg 2, or it may be actually measured only on one leg 2 and shared for both legs 2 and 2.

In general, the horizontal distance between the ankle joint 12 and the MP joint 13a while the human being 1 is in motion, such as level-ground walking, is approximately equal to the aforesaid distance Δxmp0 in the upright stationary state of the human being 1. Accordingly, in the present embodiment, the position (the position in the x-axis direction) of the MP joint 13a is determined as the position apart from the ankle joint 12 by the aforesaid distance Δxmp0 in the x-axis direction. Specifically, the value obtained by adding the distance Δxmp0 to an x-axis coordinate component x12 of the current value of the position (x12, z12) of the ankle joint 12 in the bodily coordinate system Cp obtained by the ankle position calculating means 32 is determined as the position of the MP joint 13a in the x-axis direction in the bodily coordinate system Cp.

Next, the arithmetic processing unit 16 executes the processing of the floor reaction force acting point estimating means 38 and the processing of the floor reaction force estimating means 39. In the processing of the floor reaction force acting point estimating means 38, a floor reaction force acting point related to each leg 2 in contact with the ground (the point at which total floor reaction force acting on an in-contact-with-the-ground place of the foot 13 is considered to concentrate) is estimated as described below. First, detection signals of the ground contact sensors 51f and 51r of each leg 2 are determined, and if one of the ground contact sensors 51f and 51r outputs an ON signal, then it is determined that the leg 2 is in contact with the ground. And, on the leg 2 in contact with the ground, the position of a floor reaction force acting point in the x-axis direction (the horizontal position in the advancing direction of the human being 1) is determined on the basis of the combination of ON/OFF of the ground contact sensors 51f and 51r of the leg 2 and the relative positional relationship (specifically, the relative positional relationship in the x-axis direction) among the ankle joint 12 and the MP joint 13a of the leg 2 and the bodily center of gravity G0.

Figure 6:
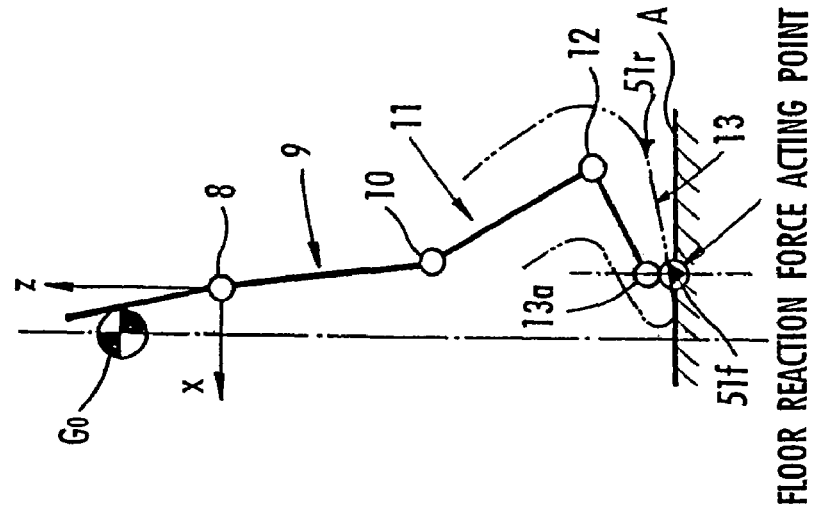
Figure 6:
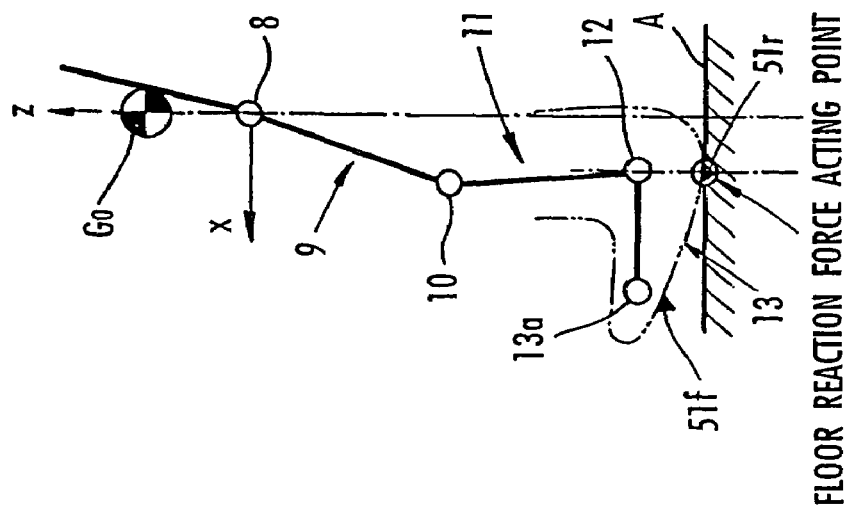

More detailedly, referring to FIG. 6 (a), if the directly below ankle ground contact sensor 51r outputs an ON signal, whereas the directly below MP ground contact sensor 51f is OFF, then it is regarded that a floor reaction force acting point exists vertically immediately below the ankle joint 12, and the position of the ankle joint 12 in the x-axis direction is determined as the position of the floor reaction force acting point in the x-axis direction (the horizontal position in the advancing direction of the human being 1). This means that the state wherein the directly below ankle ground contact sensor 51r and the directly below MP ground contact sensor 51f are ON and OFF, respectively, as described above is a state wherein the foot 13 of the leg 2 provided with the ground contact sensors 51r and 51f is in contact with a floor A at a place adjacent to the heel thereof. And, in such a state, the floor reaction force acting point of the leg 2 is positioned substantially right below (vertically below) the ankle joint 12. Thus, if the directly below ankle ground contact sensor 51r and the directly below MP ground contact sensor 51f are ON and OFF, respectively, then the position of the floor reaction force acting point in the x-axis direction of the leg 2 in contact with the ground is determined as described above. FIG. 6 (a) schematically shows only one leg 2 in contact with the ground, and the other leg is not shown. The same will apply to FIG. 6 (b) and FIGS. 7 (a) to (c) to be explained below.

Further, referring to FIG. 6 (b), if the directly below ankle ground contact sensor 51r is OFF, whereas the directly below MP ground contact sensor 51f outputs an ON signal, then it is regarded that a floor reaction force acting point exists vertically immediately below the MP joint 13a, and the position of the MP joint 13a in the x-axis direction is determined as the position of the floor reaction force acting point in the x-axis direction. This means that the state wherein the directly below ankle ground contact sensor 51r and the directly below MP ground contact sensor 51f are OFF and ON, respectively, is a state wherein the foot 13 of the leg 2 provided with the ground contact sensors 51r and 51f is in contact with the floor A at a place adjacent to the toe thereof. And, in such a state, the floor reaction force acting point of the leg 2 is positioned substantially right below (vertically below) the MP joint 13a. Thus, if the directly below ankle ground contact sensor 51r and the directly below MP ground contact sensor 51f are OFF and ON, respectively, then the position of the floor reaction force acting point in the x-axis direction of the leg 2 in contact with the ground is determined as described above.

The method for estimating the position of a floor reaction force acting point in the x-axis direction in the case of the combination of ON/OFF of the ground contact sensors 51r and 51f corresponding to FIGS. 6 (a) and (b), respectively, does not depend on the mutual positional relationship among the bodily center of gravity G0, the ankle joint 12, and the MP joint 13a.

Figure 7:
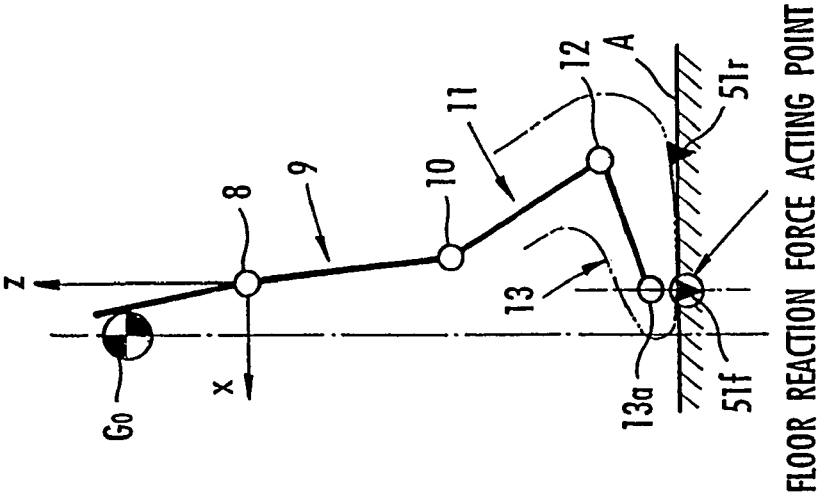

Meanwhile, if both the directly below ankle ground contact sensor 51r and the directly below MP ground contact sensor 51f output ON signals, then the position of a floor reaction force acting point in the x-axis direction is further estimated on the basis of the relative positional relationship among the bodily center of gravity G0, the ankle joint 12, and the MP joint 13a (specifically, the relative positional relationship in the x-axis direction of the bodily coordinate system Cp). More detailedly, if the bodily center of gravity G0 is positioned behind the ankle joint 12 (if the ankle joint 12 is positioned before the bodily center of gravity G0) as shown in FIG. 7 (a), then it is assumed that the floor reaction force acting point exists vertically directly below the ankle joint 12, and the position of the ankle joint 12 in the x-axis direction is determined as the position of the floor reaction force acting point in the x-axis direction. In other words, in a state wherein the ankle joint 12 of a leg 2 in contact with the ground is located before the bodily center of gravity G0, the floor reaction force related to the leg 2 is concentrated in a place adjacent to the heel of the foot 13. In such a state, the floor reaction force acting point of the leg 2 is positioned substantially directly below the ankle joint 12. Hence, if the ankle joint 12 is positioned before the bodily center of gravity G0, as shown in FIG. 7 (a), the x-axis position of the floor reaction force acting point of the leg 2 in contact with the ground is determined as described above.

Further, if the bodily center of gravity G0 is located between the MP joint 13a and the ankle joint 12 in the x-axis direction as shown in FIG. 7 (b), then it is assumed that the floor reaction force acting point exists vertically directly below the bodily center of gravity G0, and the position of the bodily center of gravity G0 in the x-axis direction is determined as the position of the floor reaction force acting point in the x-axis direction. This means that if the position of the bodily center of gravity G0 in the x-axis direction is between the MP joint 13a and the ankle joint 12 of the leg 2 in contact with the ground, the floor reaction force related to the leg 2 concentrates in the vicinity of a spot vertically below the bodily center of gravity G0. Thus, if the position of the bodily center of gravity G0 in the x-axis direction is between the MP joint 13a and the ankle joint 12 of the leg 2 in contact with the ground, as shown in FIG. 7 (b), the x-axis position of the floor reaction force acting point of the leg 2 in contact with the ground is determined as described above.

Further, if the bodily center of gravity G0 is positioned before the MP joint 13a (if the MP joint 13a is positioned behind the bodily center of gravity G0) as shown in FIG. 7 (c), then it is assumed that the floor reaction force acting point exists vertically directly below the MP joint 13a, and the position of the MP joint 13a in the x-axis direction is determined as the position of the floor reaction force acting point in the x-axis direction. In other words, in a state wherein the MP joint 13a of a leg 2 in contact with the ground is located behind the bodily center of gravity G0, the floor reaction force related to the leg 2 is concentrated in a place adjacent to the toe of the foot 13. In such a state, the floor reaction force acting point of the leg 2 is positioned substantially directly below the MP joint 13a. Hence, if the MP joint 13a is positioned behind the bodily center of gravity G0, as shown in FIG. 7 (c), the x-axis position of the floor reaction force acting point of the leg 2 in contact with the ground is determined as described above.

The x-axis position of the floor reaction force acting point of each leg 2 in contact with the ground is estimated by the processing of the floor reaction force acting point estimating means 38 explained above. The relationship among the combinations of ON and OFF of both ground contact sensors 51r and 51f, the relative positional relationship among the bodily center of gravity G0, the ankle joint 12 and the MP joint 13a, and the position of a floor reaction force acting point in the x-axis direction obviously applies to a case where the human being 1 is walking on a flat ground and generally applies also to a case where, for example, the human being 1 sits onto a chair or rises from the chair, and a case where the human being 1 walks on a staircase or a slope.

Further in the processing of the floor reaction force acting point estimating means 38, the vertical position (the position in the z-axis direction) of the floor reaction force acting point of each leg 2 in contact with the ground is determined as described below. First, on each leg 2 in contact with the ground, the distance between the ankle joint 12 of the leg 2 and a ground contact surface (the floor A) is grasped. In this case, according to the present embodiment, a value stored and retained beforehand in the arithmetic processing unit 16 is grasped as the distance between the ankle joint 12 and the ground contact surface (the floor A)(hereinafter referred to as "the distance between the ankle joint and the ground contact surface"). To be more specific, referring to FIG. 5 mentioned above, a distance Ha from the center of the ankle joint 12 to the floor A surface (the ground contact surface) when the human being 1 is in the upright stationary state (hereinafter referred to as "the ankle joint reference height Ha") is actually measured in advance and retained in a memory of the arithmetic processing unit 16. The ankle joint reference height Ha may be actually measured for each leg 2 separately, or only one leg 2 may be actually measured and retained in a memory to be shared for both legs 2. Thus, the ankle joint reference height Ha stored and retained as described above is grasped as the distance between the ankle joint and the ground contact surface.

As discussed above, the distance between the ankle joint and the ground contact surface is grasped, and then the vertical position (the position in the z-axis direction) of a floor reaction force acting point is determined as the position vertically apart downward from the position of the ankle joint 12 by the grasped distance between the ankle joint and the ground contact surface. In other words, the vertical position (the position in the bodily coordinate system Cp) of the floor reaction force acting point is determined as the value obtained by subtracting the distance between the ankle joint and the ground contact surface, which has been grasped as described above, from the value of the z-axis component of the position of the ankle joint 12 (the upward direction being defined as the positive direction of the z-axis).

According to the present embodiment, in order to calculate a joint moment by a joint moment estimating means 40, which will be discussed hereinafter, the position of the floor reaction force acting point in the bodily coordinate system Cp decided as described above (xz-coordinate component) is further converted into a position defined, using the position of the ankle joint 12 in the bodily coordinate system Cp calculated by the ankle position calculating means 32 as its reference. More specifically, the estimated position of a floor reaction force acting point is determined by conversion into a positional vector based on the position of the ankle joint 12 as the reference (hereinafter referred to as "the floor reaction force acting point vector").

By the processing of the floor reaction force acting point estimating means 38 explained above, the floor reaction force acting point vectors (the positions in the x-axis direction and the z-axis direction) based on the ankle joint 12 are estimated on each leg 2 in contact with the ground.

In the processing of the floor reaction force estimating means 39, if the motion mode of the leg 2 determined at the current cycle time by the leg motion determining means 25 is the single stance state, then the estimated value of the floor reaction force $F={}^T(Fx, Fz)$ acting on the leg 2 in contact with the ground is determined according to the above Equation (2) from the values of the weight M of the human being 1 and the gravity acceleration g (these are stored in the arithmetic processing unit 16 beforehand) and the current value of the acceleration $a={}^T(ax, az)$ of the bodily center of gravity G0 in the absolute coordinate system Cf determined by the bodily center of gravity acceleration calculating means 34. In this case, the floor reaction force acting on the leg 2 not in contact with the ground (the free leg 2) is ${}^T(0, 0)$.

If the motion state of the leg 2 determined at the current cycle time by the leg motion determining means 25 is the double stance state, then the estimated values of the floor reaction forces $Ff={}^T(Ffx, Ffz)$ and $Fr={}^T(Frx, Frz)$ of the individual legs 2 are determined according to the above Equation (5) from the weight M of the human being 1 and the gravity acceleration g, the current value of the acceleration $a={}^T(ax, az)$ of the bodily center of gravity G0 in the absolute coordinate system Cf determined by the bodily center of gravity acceleration calculating means 34, and the data of the current values of the positions of the ankle joints 12 of the individual legs 2 relative to the bodily center of gravity G0 determined by the ankle position calculating means 32 (the current values of data of $\Delta Xf$, $\Delta Zf$, $\Delta Xr$, and $\Delta Zr$ of Equation (5)).

Meanwhile, the arithmetic processing unit 16 carries out the processing of the means 35 for calculating the acceleration of each portion of a leg and the means 36 for calculating the angular acceleration of each portion of a leg in parallel to the processing of the bodily center of gravity position calculating means 31, the bodily center of gravity acceleration calculating means 34, the ankle position calculating means 32, the MP position calculating means 33, the floor reaction force acting point estimating means 38, and the floor reaction force estimating means 39 described above.

In this case, in the processing of the means 35 for calculating the acceleration of each portion of a leg, as in the processing of the bodily center of gravity acceleration calculating means 34, first, the two-level differential values of the positions of the centers of gravity G1 and G2 of the thigh 9 and the crus 11 in the bodily coordinate system Cp, that is, the accelerations of the centers of gravity G1 and G2 of the thigh 9 and the crus 11 in the bodily coordinate system Cp (the accelerations relative to the origin O of the bodily coordinate system Cp), are determined, using the time-series data of the positions of the centers of gravity G1 and G2 of the thigh 9 and the crus 11, which are rigid corresponding parts of the legs 2 in the bodily coordinate system Cp determined by the means 30 for calculating the position of the center of gravity of each portion at each cycle time. Then, the vector sum of the aforesaid accelerations and the acceleration $a_0 = {}^T(a_0x, a_0z)$ in the absolute coordinate system Cf of the waist 3 obtained by the reference acceleration measuring means 28 is determined, thereby determining the accelerations of the thigh 9 and the crus 11, respectively, in the absolute coordinate system Cf (more specifically, the coordinate components of the accelerations in the absolute coordinate system Cf).

In the processing of the means 36 for calculating the angular acceleration of each portion of a leg, the time series data of the inclination angles θc and θd of the thigh 9 and the crus 11 of each leg 2 obtained by the leg posture calculating means 29 for each cycle time is used to determine the two-level differential values of the inclination angles θc and θd of the thigh 9 and the crus 11, that is, the angular accelerations of the thigh 9 and the crus 11, respectively.

Next, the arithmetic processing unit 16 executes the processing of the joint moment estimating means 40 to determine the moments acting on the knee joint 10 and the hip joint 8 of each leg 2. This processing is carried out on the basis of a so-called inverse dynamics model by using the current values of the data determined by the floor reaction force estimating means 39, the means 35 for calculating the acceleration of each portion of a leg, the means 36 for calculating the angular acceleration of each portion of a leg, the floor reaction force acting point estimating means 38, and the leg posture calculating means 29, respectively. The inverse dynamics model uses an equation of motion related to a translational motion and the equation of motion related to a rotational motion of each rigid corresponding part of the human being 1 to determine moments acting on joints in order, beginning with a joint closest to a floor reaction force acting point. In the present embodiment, the moments acting on the knee joint 10 and the hip joint 8 of each leg 2 are determined in order.

Figure 8:
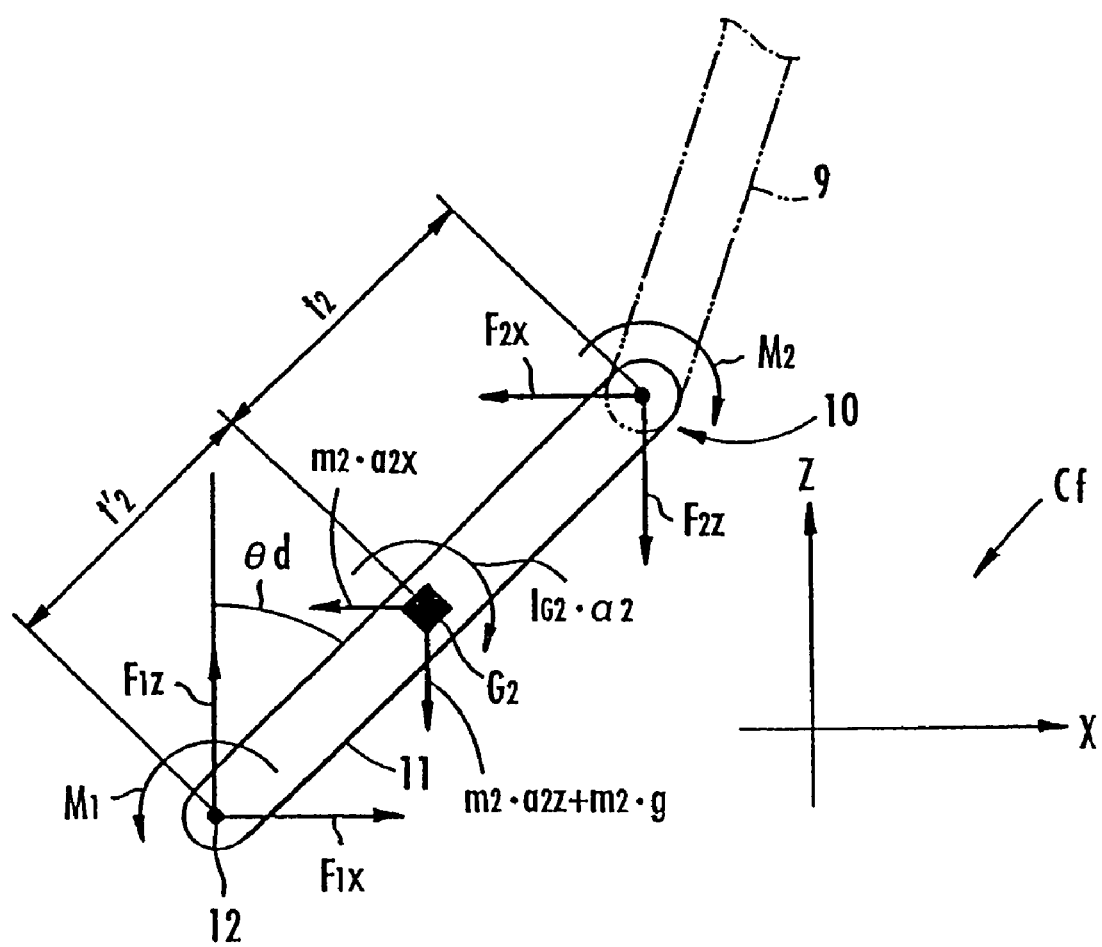
FIG. 8 is a diagram for explaining the processing in a joint moment estimating means of the arithmetic processing unit of FIG. 3.

To be more specific, referring to FIG. 8, first, regarding the crus 11 of each leg 2, the force acting on the ankle joint 12 of the distal portion of the crus 11 (the joint reaction force), the force acting on the portion of the knee joint 10 of the crus 11 (the joint reaction force), and the translational acceleration of the center of gravity G2 of the crus 11 are denoted by ${}^T(F_1x, F_1z)$, ${}^T(F_2x, F_2z)$, and ${}^T(a_2x, a_2z)$, respectively, according to the component notation in the absolute coordinate system Cf, and the weight of the crus 11 is denoted by $m_2$. At this time, the equation of motion related to the translational motion of the center of gravity G2 of the crus 11 will be the following equation (10):

$${}^T(m_2 \cdot a_2x, m_2 \cdot a_2z) = {}^T(F_1x - F_2x, F_1z - F_2z - m_2 \cdot g) \text{ therefore,}$$

$${}^T(F_2x, F_2z) = T(F_1x - m_2 \cdot a_2x, F_1z - m_2 \cdot a_2z - m_2 \cdot g) \quad (10)$$

The acceleration ${}^T(a_2x, a_2z)$ of the center of gravity G2 of the crus 11 is determined by the means 35 for calculating the acceleration of each portion of a leg. The joint reaction force ${}^T(F_1x, F_1z)$ acting on the ankle joint 12 of the distal portion of the crus 11 is approximately equal to the estimated value of the floor reaction force determined by the floor reaction force estimating means 39 on the leg 2 having the crus 11. To be more specific, in a single stance state, if the leg 2 is in contact with the ground, then the joint reaction force ${}^T(F_1x, F_1z)$ is the floor reaction force ${}^T(Fx, Fz)$ determined according to the above Equation (2). If the leg 2 is a free leg, then ${}^T(F_1x, F_1z) = {}^T(0, 0)$. In a double stance state, if the leg 2 is the leg at the rear side relative to the advancing direction of the human being 1, then the joint reaction force ${}^T(F_1x, F_1z)$ is the floor reaction force ${}^T(Frx, Frz)$ of the above Equation (5), whereas if the leg 2 is at the front side, then it is the floor reaction force ${}^T(Ffx, Ffz)$ of the above Equation (5).

Thus, the joint reaction force ${}^T(F_2x, F_2z)$ acting on the knee joint 10 of each leg 2 is determined according to the above Equation (10) from the data of the acceleration ${}^T(a_2x, a_2z)$ of the center of gravity G2 of the crus 11 determined by the means 35 for calculating the acceleration of each portion of a leg, the data of the floor reaction force ($={}^T(F_1x, F_1z)$) determined by the floor reaction force estimating means 39, the data of the weight $m_2$ of the crus 11 determined in advance, and the value of the gravity acceleration g.

Referring to FIG. 8, the moment acting on the ankle joint 12 of the distal portion of the crus 11 is denoted by $M_1$, the moment acting on the portion of the knee joint 10 of the crus 11 is denoted by $M_2$, the inertial moment about the center of gravity G2 of the crus 11 is denoted by $I_{G2}$, and the angular acceleration about the center of gravity G2 of the crus 11 is denoted by $a_2$. In association with FIG. 4 mentioned above, if the distance between the center of gravity G2 of the crus 11 and the center of the knee joint 10 is denoted by t2, and the distance between the center of gravity G2 of the crus 11 and the ankle 12 is denoted by t2' ($=Ld-t2$), then the equation of motion related to the rotational motion about the center of gravity G2 of the crus 11 will be Equation (11) shown below:

$$I_{G2} \cdot a_2 = M_1 - M_2 + F_1x \cdot t2' \cdot \cos\theta d - F_1z \cdot t2' \cdot \sin\theta d + F_2x \cdot t2 \cdot \cos\theta d - F_2z \cdot t2 \cdot \sin\theta d \quad (11)$$

therefore, $$M_2 = M_1 - I_{G2} \cdot a_2 + F_1x \cdot t2' \cdot \cos\theta d - F_1z \cdot t2' \cdot \sin\theta d + F_2x \cdot t2 \cdot \cos\theta d - F_2z \cdot t2 \cdot \sin\theta d$$

where $M_1$ in Equation (11) denotes the moment obtained in terms of the outer product (vector product) of the floor reaction force acting point vector determined as described above by the floor reaction force acting point estimating means 38 on the leg 2 having the crus 11 related to Equation (11) and the floor reaction force vector determined by the floor reaction force estimating means 39 on the leg 2. Further, $a_2$ denotes the angular acceleration of the crus 11 determined by the means 36 for calculating the angular acceleration of each portion of a leg. Further, θd denotes the inclination angle of the crus 11 determined by the leg posture calculating means 29. Further, ${}^T(F_1x, F_1z)$ denotes the estimated value of a floor reaction force determined by the floor reaction force estimating means 39 as described above. Further, ${}^T(F_2x, F_2z)$ is determined according to the above Equation (10). Further, the inertial moment $1_{G2}$ is determined together with the data or the like of the weight $m_2$ and size of the crus 11 and stored in the arithmetic processing unit 16 beforehand.

Accordingly, the moment $M_2$ acting on the knee joint 10 is determined by the above Equation (11) from the data of the estimated value of a floor reaction force obtained by the floor reaction force estimating means 39, the data of the estimated value of a floor reaction force acting point vector obtained by the floor reaction force acting point estimating means 38, the data of the angular acceleration $a_2$ of the crus 11 obtained by the means 36 for calculating the angular acceleration of each portion of a leg, the data of the inclination angle θd of the crus 11 obtained by the leg posture calculating means 29, the data of the joint reaction force $^T(F_2x, F_2z)$ determined according to the above Equation (10), and the data of the inertial moment $I_{G2}$, the size (Ld), and the position (t2) of the center of gravity G2 of the crus 11 determined in advance.

After determining the moment $M_2$ acting on the portion of the knee joint 10 of the crus 11 as described above, the joint moment estimating means 40 determines the moment acting on the portion of the hip joint 8 of the thigh 9 by the same processing as the calculation processing therefor. The basic concept of this processing is the same as that of the technique for determining the moment $M_2$ of the knee joint 10, so that detailed illustration and explanation will be omitted, an outline thereof being given below.

First, the joint reaction force $^T(F_3x, F_3z)$ acting on the portion of the hip joint 8 of the thigh 9 is determined according to the following Equation (12) (equation having the same form as that of the above Equation (10)) based on the equation of motion related to the translational motion of the center of gravity G1 of the thigh 9 (refer to FIG. 4).

$$^T(F_3x, F_3z) = {}^T(F_2x - m_1 \cdot a_1x, F_2z - m_1 \cdot a_1z - m_1 \cdot g) \quad (12)$$

where $^T(F_2x, F_2z)$ denotes a joint reaction force of the knee joint 10 determined previously according to the Equation (10). Further, $^T(a_1x, a_1z)$ denotes an acceleration (translational acceleration), in the absolute coordinate system Cf, of the center of gravity G1 of the thigh 9 determined by the means 35 for calculating the acceleration of each portion of a leg. Further, $m_1$ denotes the weight of the thigh 9 determined in advance, and g denotes a gravitational acceleration.

Subsequently, a moment $M_3$ acting on the portion of the hip joint 8 of the thigh 9 is determined according to Equation (13) given below (an equation of the same form as that of the above Equation (11)) on the basis of the equation of motion related to a rotational motion about the center of gravity G1 of the thigh 9.

$$M_3 = M_2 - I_{G1}\alpha_1 + F_2x \cdot t1' \cdot \cos\theta c - F_2z \cdot t1' \cdot \sin\theta c + F_3x \cdot t1 \cdot \cos\theta c - F_3z \cdot t1 \cdot \sin\theta c \quad (13)$$

$M_2$ denotes the moment of the knee joint 10 determined according to the above Equation (11), $^T(F_2x, F_2z)$ denotes a joint reaction force of the knee joint 10 determined according to the Equation (10), $^T(F_3x, F_3z)$ denotes a joint reaction force of the hip joint 8 determined according to the Equation (12), $I_{G1}$ denotes an inertial moment about the center of gravity G1 of the thigh 9 determined in advance, $\alpha_1$ denotes an angular acceleration of the thigh 9 determined by the means 36 for calculating the angular acceleration of each portion of a leg, and θc denotes an inclination angle of the thigh 9 determined by the leg posture calculating means 29. Further, t1 denotes the distance from the center of the hip joint 8 to the center of gravity G1 of the thigh 9 (refer to FIG. 4), and t1' denotes the distance from the center of knee joint 10 to the center of gravity G1 of the thigh 9 ($L_c$–t1 in FIG. 4), these being decided on the basis of the position of the center of gravity G1 and the size (length) of the thigh 9 determined in advance.

The processing explained above is successively executed at each cycle time of the arithmetic processing unit 16 to estimate, in real-time, the floor reaction force acting on each leg 2 and the moments acting on the knee joint 10 and the hip joint 8 of each leg 2.

Although detailed explanation in the present specification will be omitted, the estimated values of the moments of the knee joint 10 and the hip joint 8 that have been determined are used for, e.g., controlling an apparatus that aids the walking of the human being 1 (an apparatus that includes an electric motor or the like capable of imparting auxiliary torque to the knee joint 10 or the hip joint 8).

Figure 9:
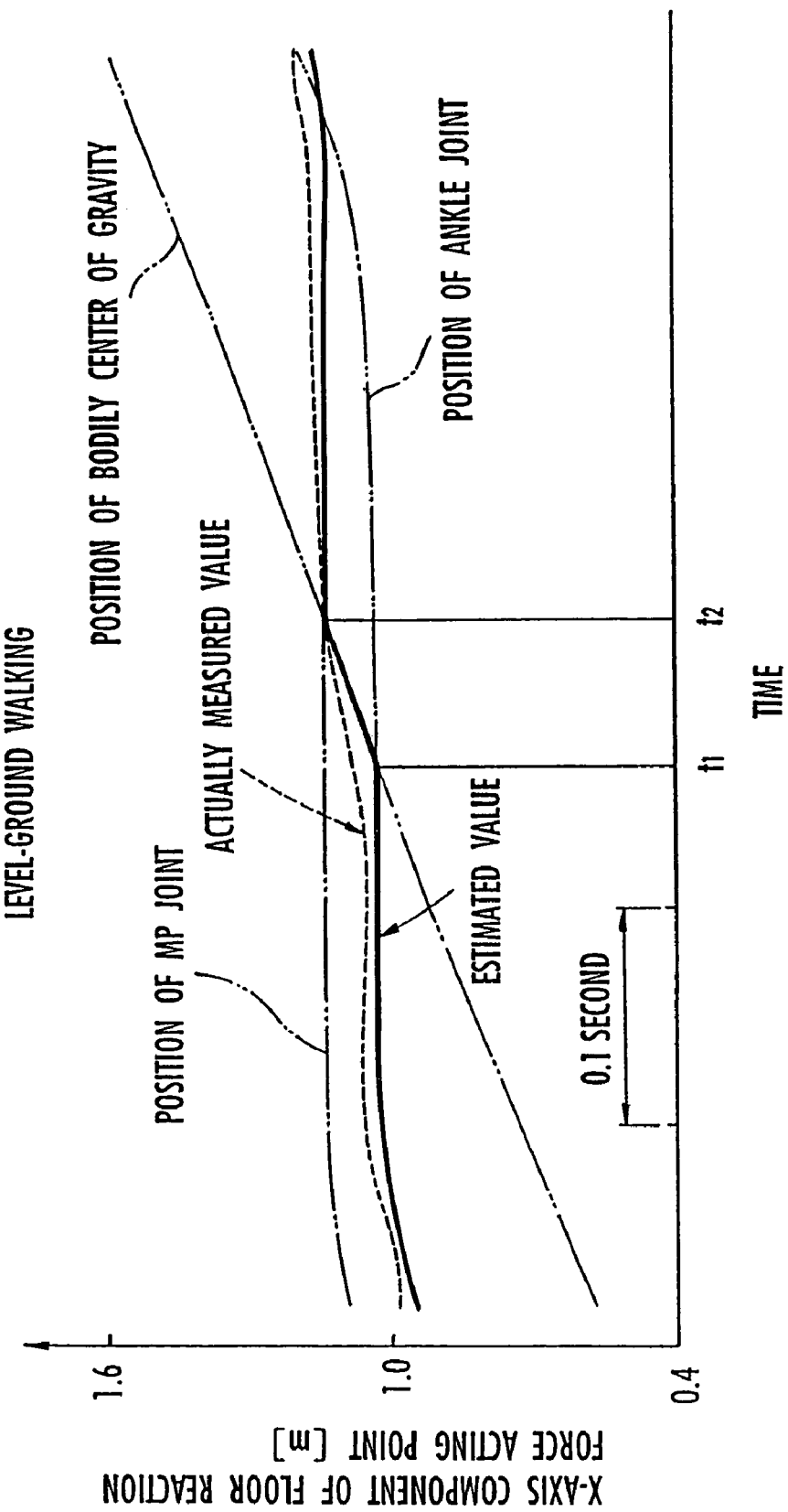
FIG. 9 and FIG. 10 are graphs illustrating the time-dependent changes in the horizontal position and the vertical position, respectively, of a floor reaction force acting point in a level-ground walking mode determined according to the first embodiment of the present invention.
Figure 10:
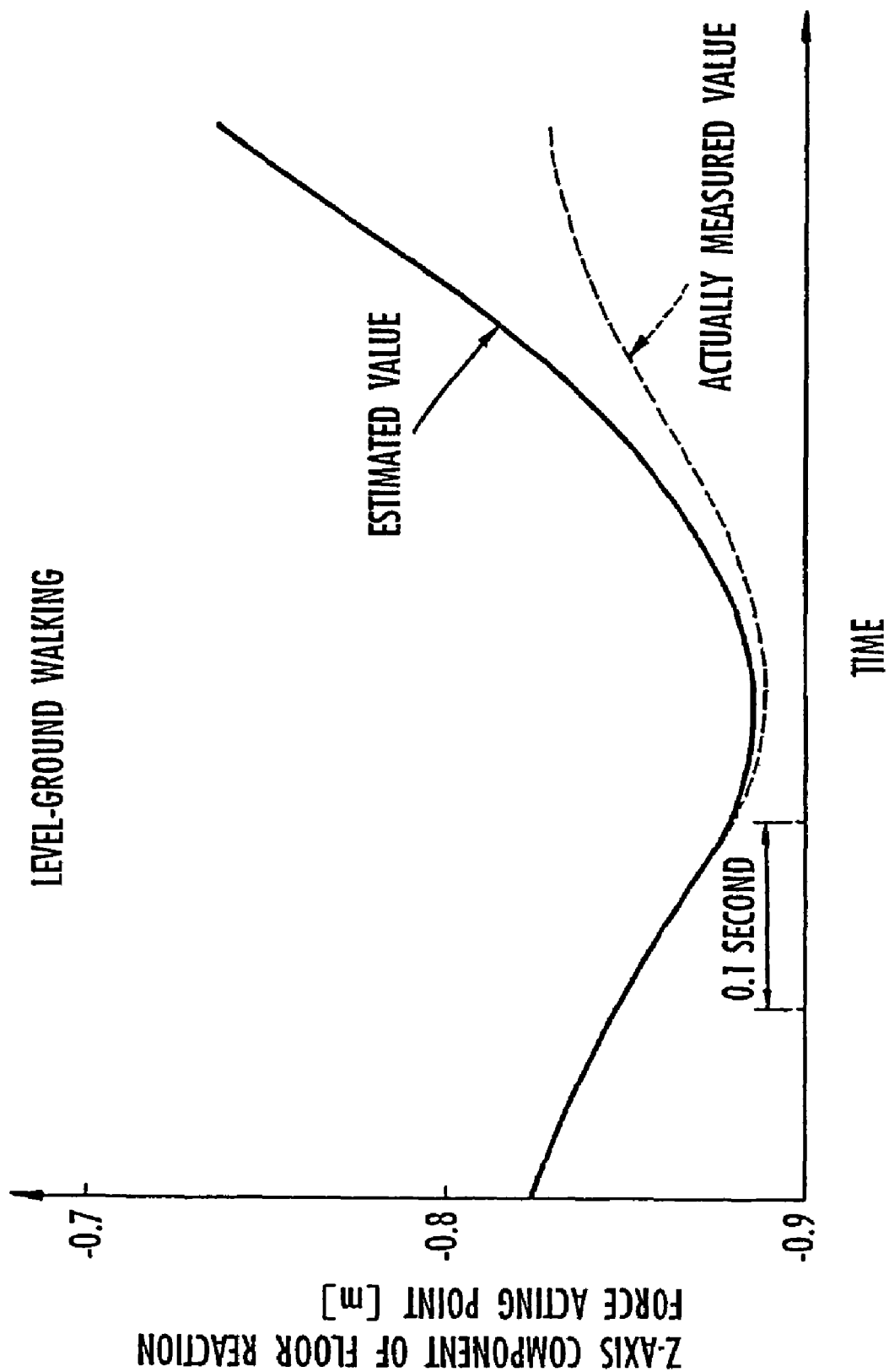

Examples of the time-dependent changes in the estimated value of a floor reaction force acting point determined by the processing of the arithmetic processing unit 16 described above are indicated by the solid lines in FIG. 9 and FIG. 10. FIG. 9 and FIG. 10 show, with the solid lines, the time-dependent changes in a component in the x-axis direction (a horizontal component in the advancing direction) and a component in the z-axis direction (a vertical component) of the estimated value of a floor reaction force acting point of a leg 2 from the moment the leg 2 comes in contact with the ground to the moment it leaves the floor when the human being 1 is walking on a level ground at a moving speed of, for example, about 4.5 km/h. In this case, the component in the x-axis direction shown in FIG. 9 has been converted to the absolute coordinate system Cf fixed to the floor A. The component in the z-axis direction shown in FIG. 10 is expressed in terms of a z-axis coordinate value (corresponding to the vertical distance from the center of the hip joint 8 to a floor reaction force acting point) in the bodily coordinate system Cp. FIG. 9 and FIG. 10 also show, with dashed lines, a component in the x-axis direction and a component in the z-axis direction of a floor reaction force acting point actually measured using a force plate or the like. As seen in these FIG. 9 and FIG. 10, the estimated values of the floor reaction force acting points agree with actually measured values with relatively good accuracy.

Regarding the component in the z-axis direction shown in FIG. 10, the difference between the estimated value and the actually measured value exhibits a relatively large increase immediately before the leg 2 leaves the floor. This is because, in the present embodiment, the vertical position (the position in the z-axis direction) of the floor reaction force acting point is determined with a fixed vertical distance between the ankle joint 12 and the floor reaction force acting point (being equal to the distance Ha between the ankle joint and the ground contact surface in FIG. 5), so that the error of the vertical position of the floor reaction force acting point increases in such a state wherein the heel side of the foot 13 floats from the floor A, as in the case of immediately before the leg 2 leaves the floor.

Supplementally to FIG. 9, this figure, FIG. 9, also shows the calculated values of the positions of the MP joint 13a, the bodily center of gravity G0, and the ankle joint 12 in the x-axis direction (the values converted into the absolute coordinate system Cf). Since the position of a floor reaction force acting point in the x-axis direction in a level-ground walking mode is estimated as described above, in a period in which the bodily center of gravity G0 is located behind the ankle joint 12 (the period until time t1), the position of the floor reaction force acting point in the x-axis direction agrees with the position of the ankle joint 12 in the x-axis direction. In a period wherein the bodily center of gravity G0 is located between the ankle joint 12 and the MP joint 13a in the x-axis direction (the period from time t1 to t2), the position of the floor reaction force acting point in the x-axis direction agrees with the position of the bodily center of gravity G0 in the x-axis direction. Further, in a period wherein the bodily center of gravity G0 is located before the MP joint 13a (the period after time t2), the position of the floor reaction force acting point in the x-axis direction agrees with the position of the MP joint 13a in the x-axis direction.

Figure 11:
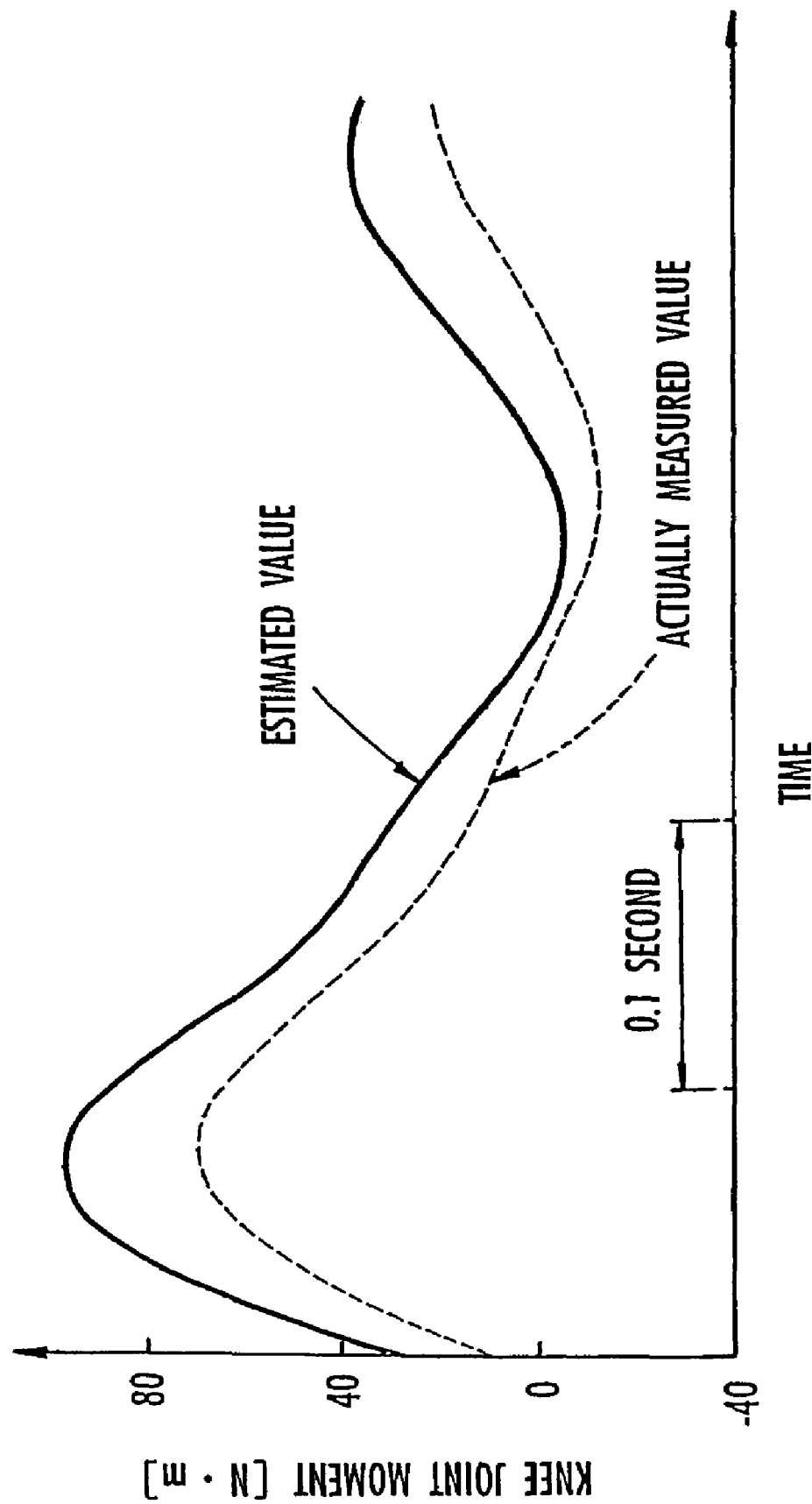
FIG. 11 and FIG. 12 are graphs illustrating the time-dependent changes in a knee joint moment and a hip joint moment, respectively, in the level-ground walking mode determined according to the first embodiment of the present invention.
Figure 12:
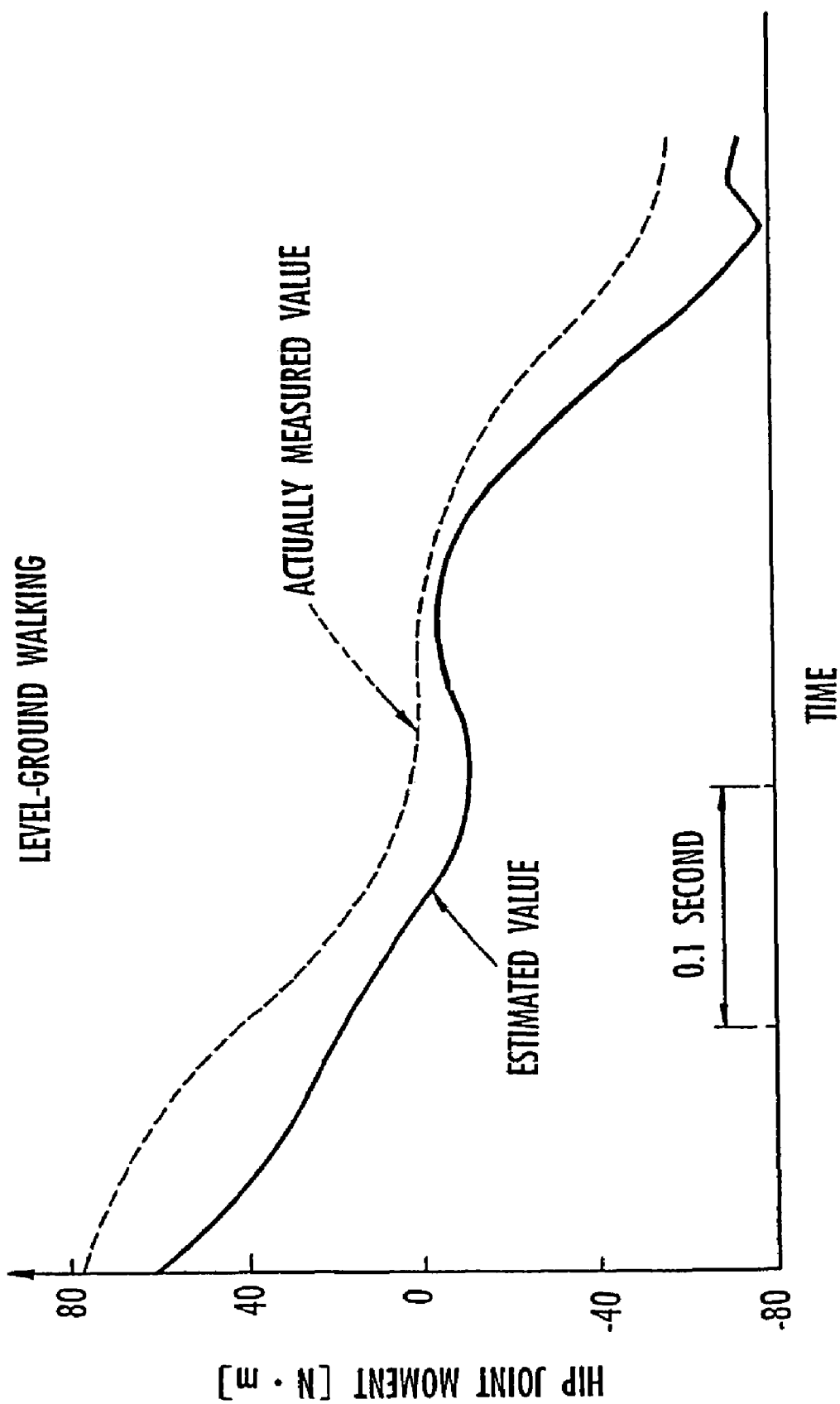
Figure 13:
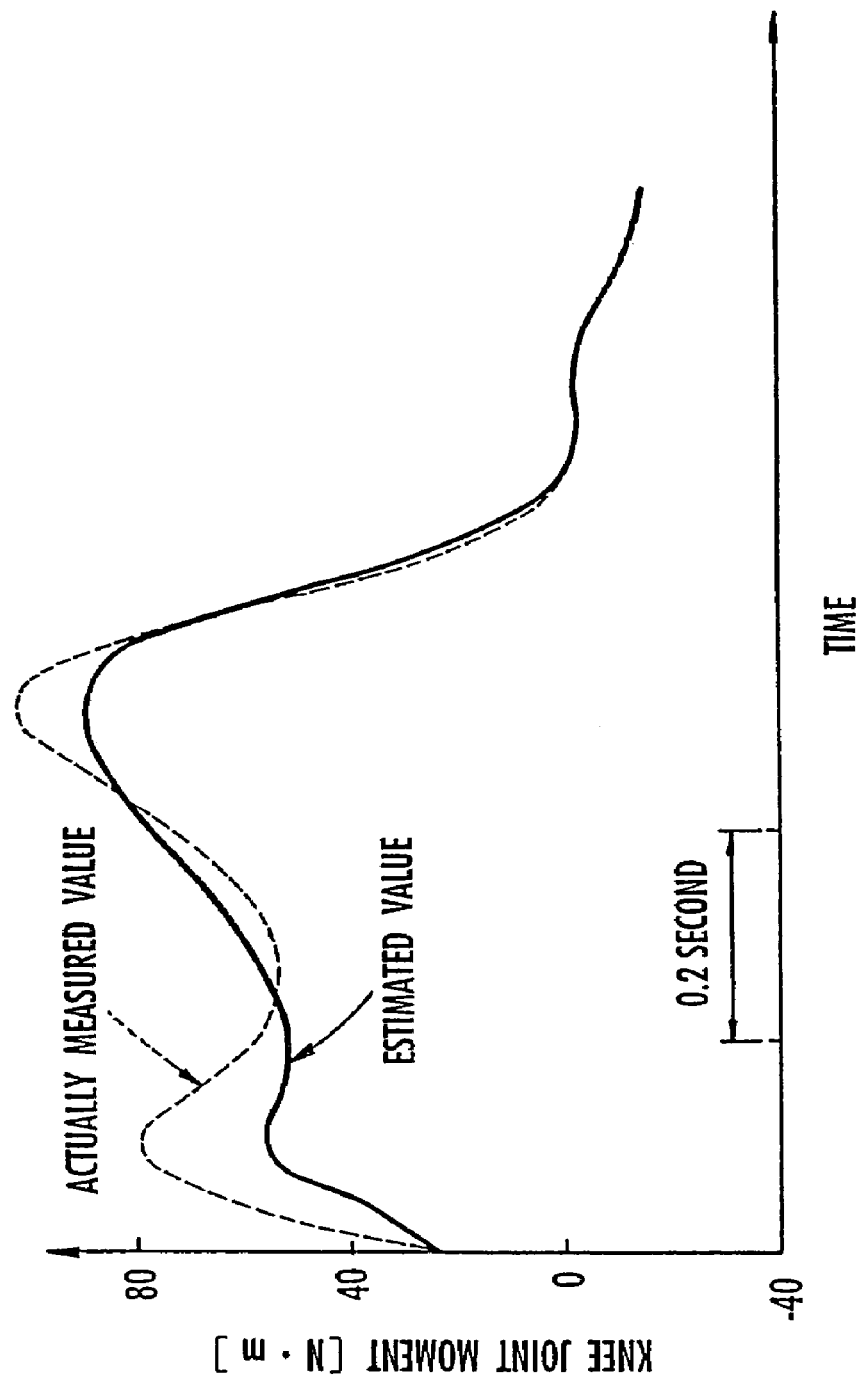
FIG. 13 and FIG. 14 are graphs illustrating the time-dependent changes in a knee joint moment and a hip joint moment, respectively, in a staircase descent walking mode determined according to the first embodiment of the present invention.
Figure 14:
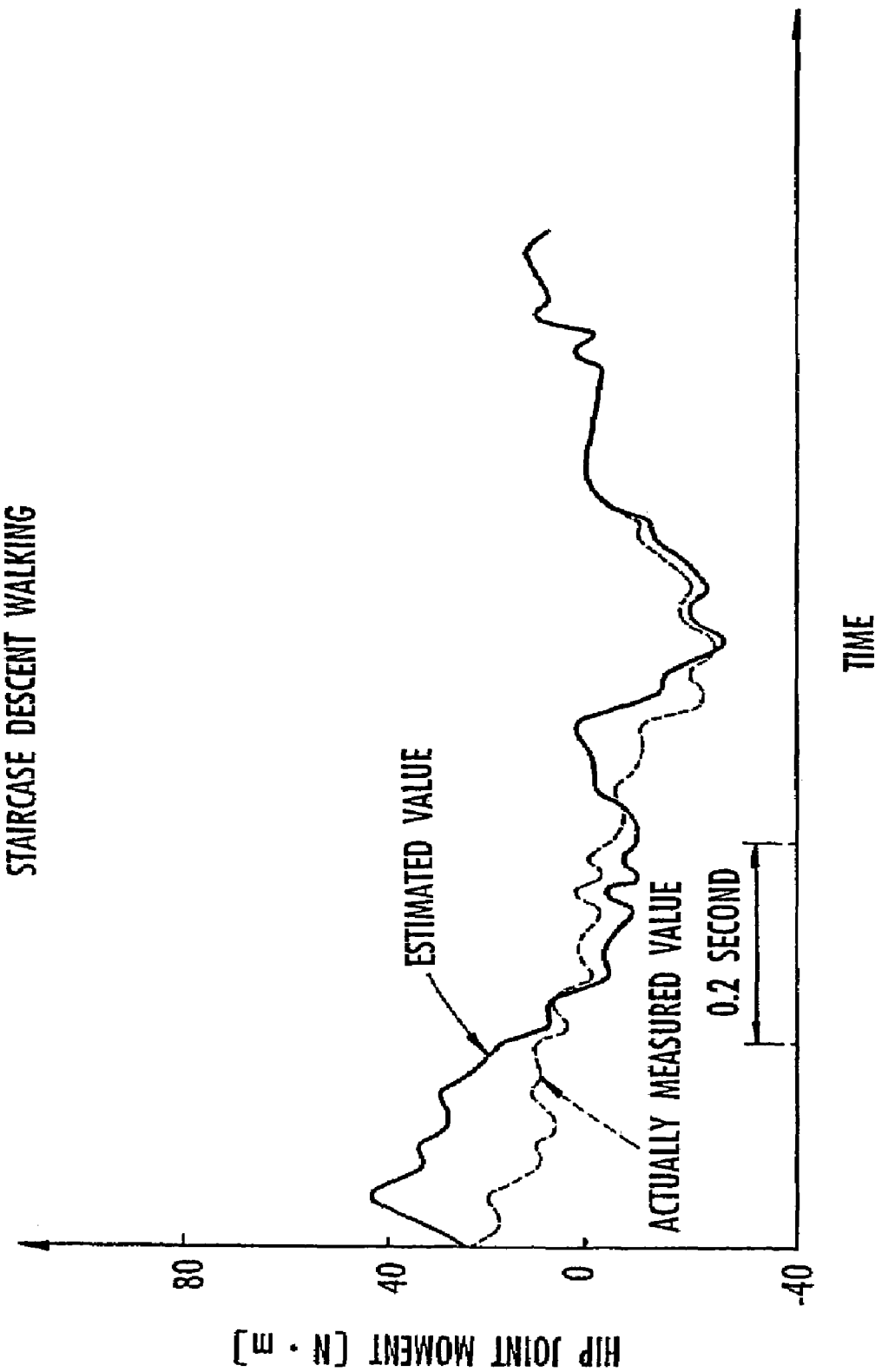
Figure 15:
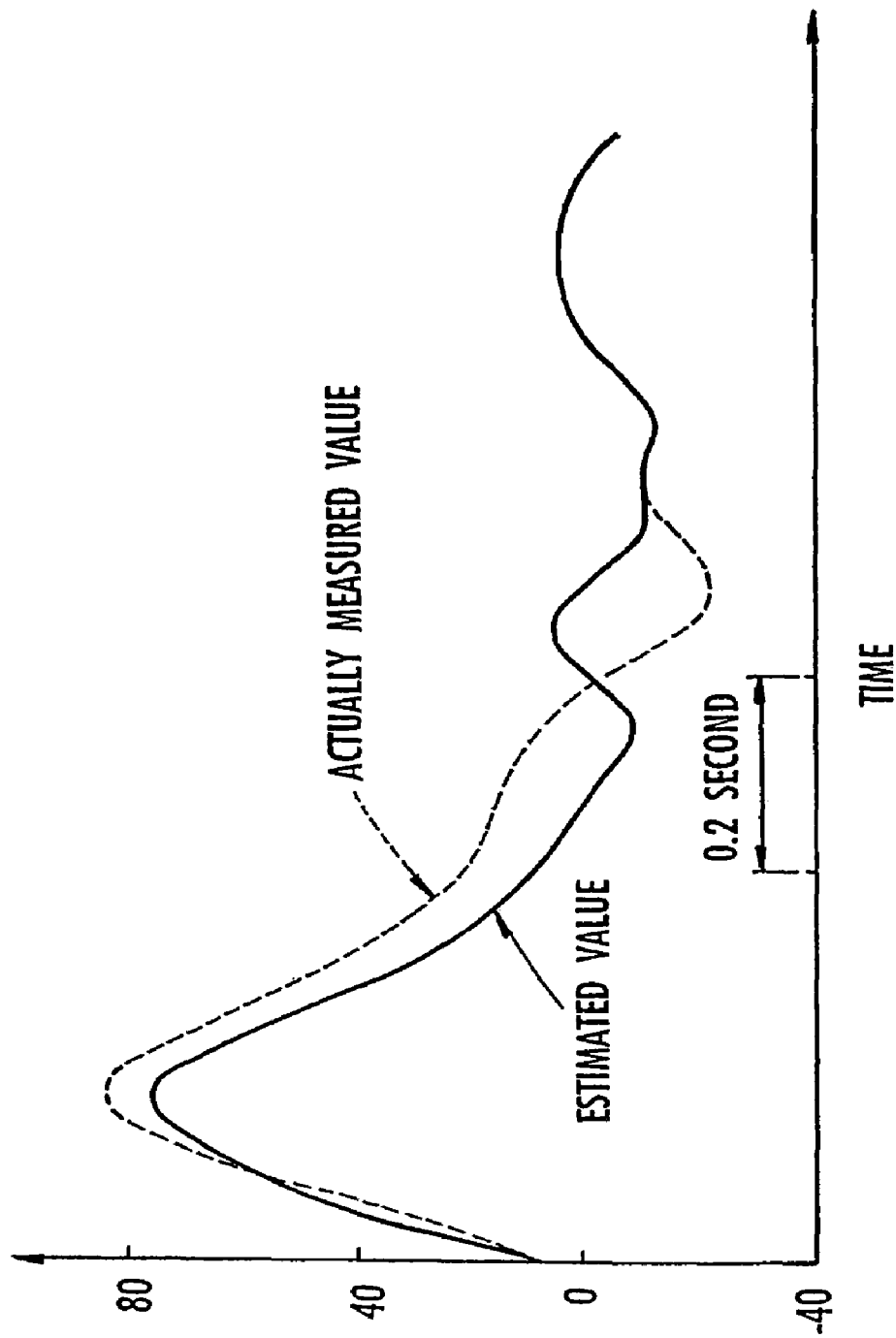
FIG. 15 and FIG. 16 are graphs illustrating the time-dependent changes in a knee joint moment and a hip joint moment, respectively, in a staircase ascent walking mode determined according to the first embodiment of the present invention.
Figure 16:
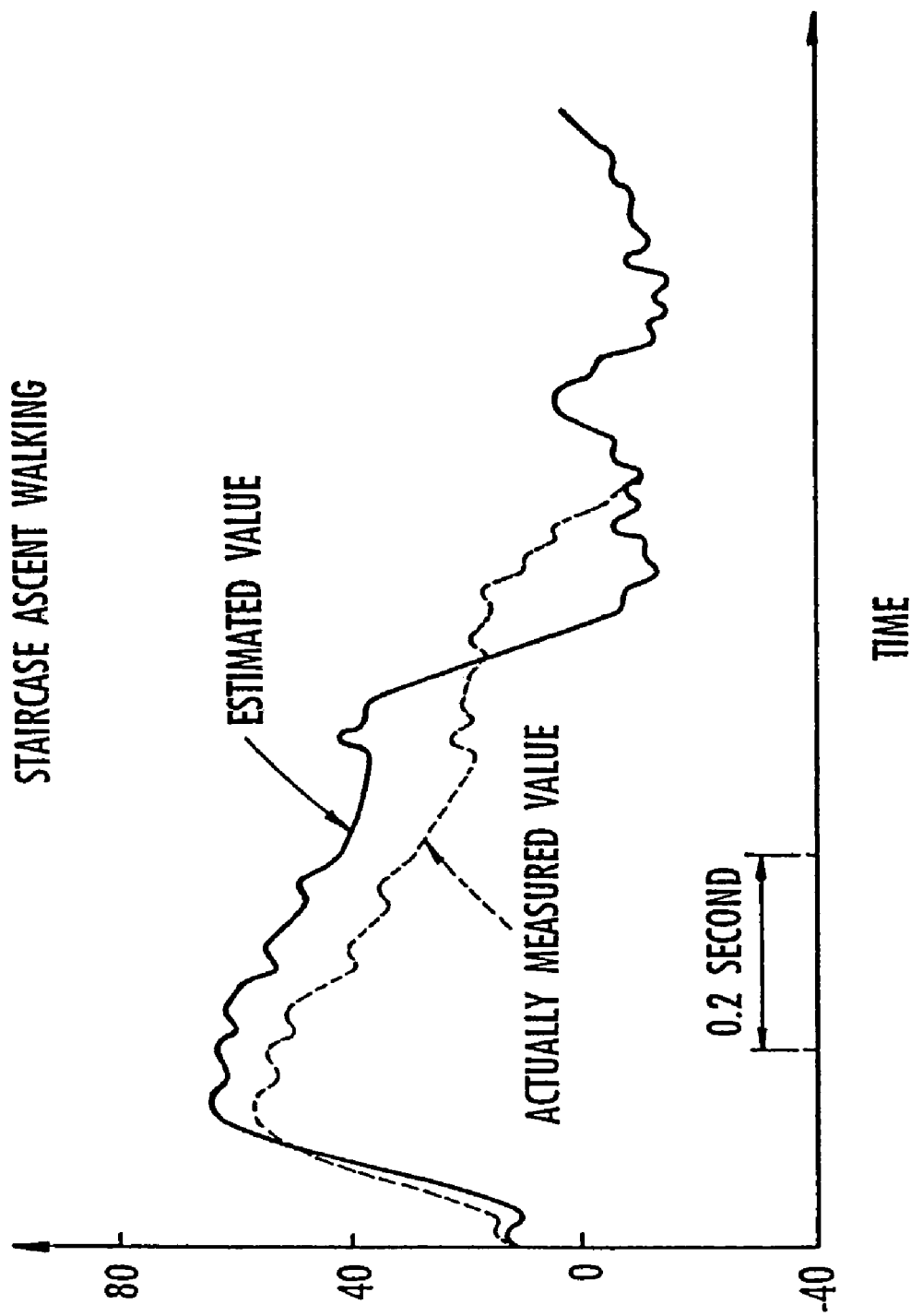
Figure 17:
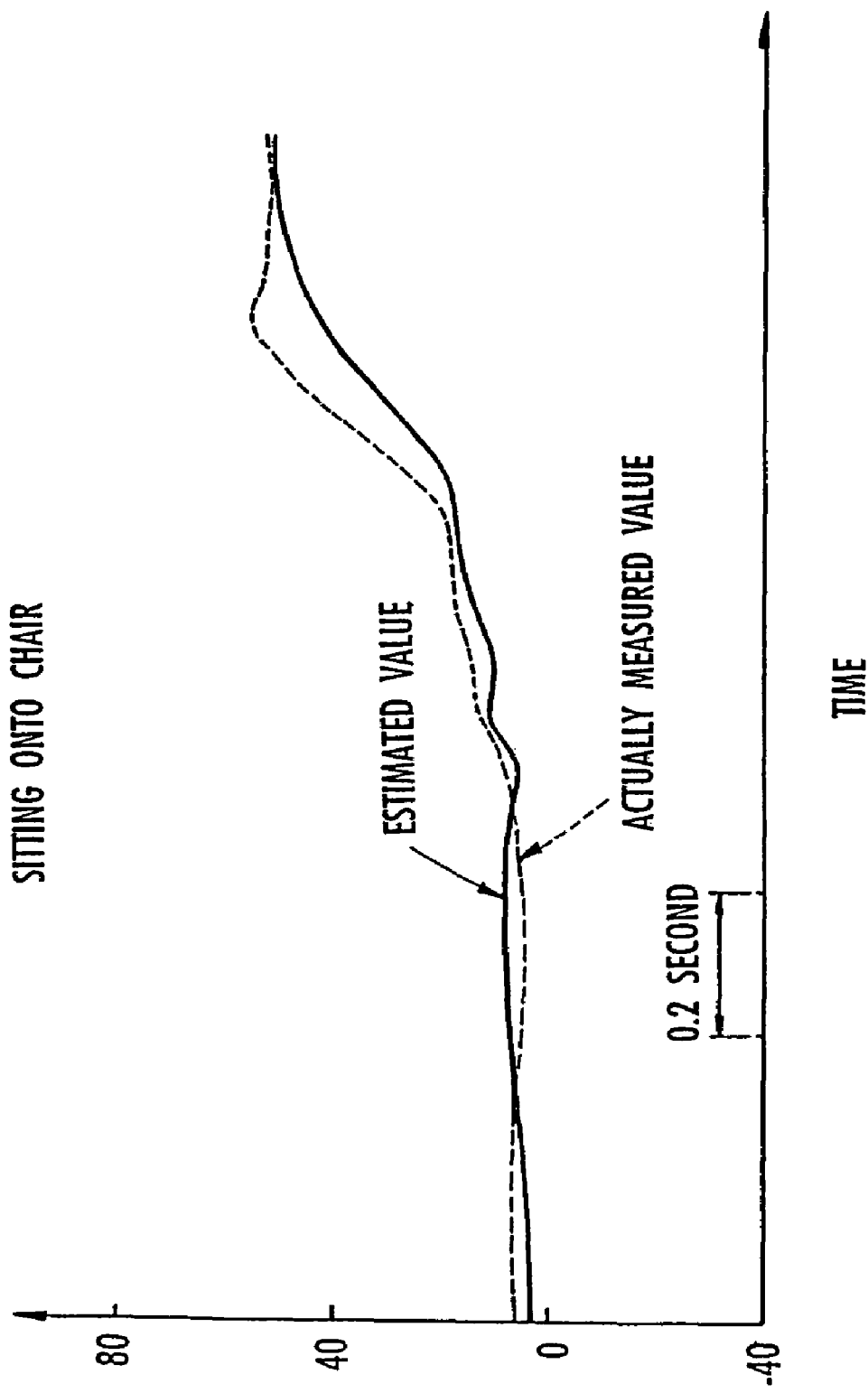
FIG. 17 and FIG. 18 are graphs illustrating the time-dependent changes in a knee joint moment and a hip joint moment, respectively, in a sitting-onto-a-chair mode determined according to the first embodiment of the present invention.
Figure 18:
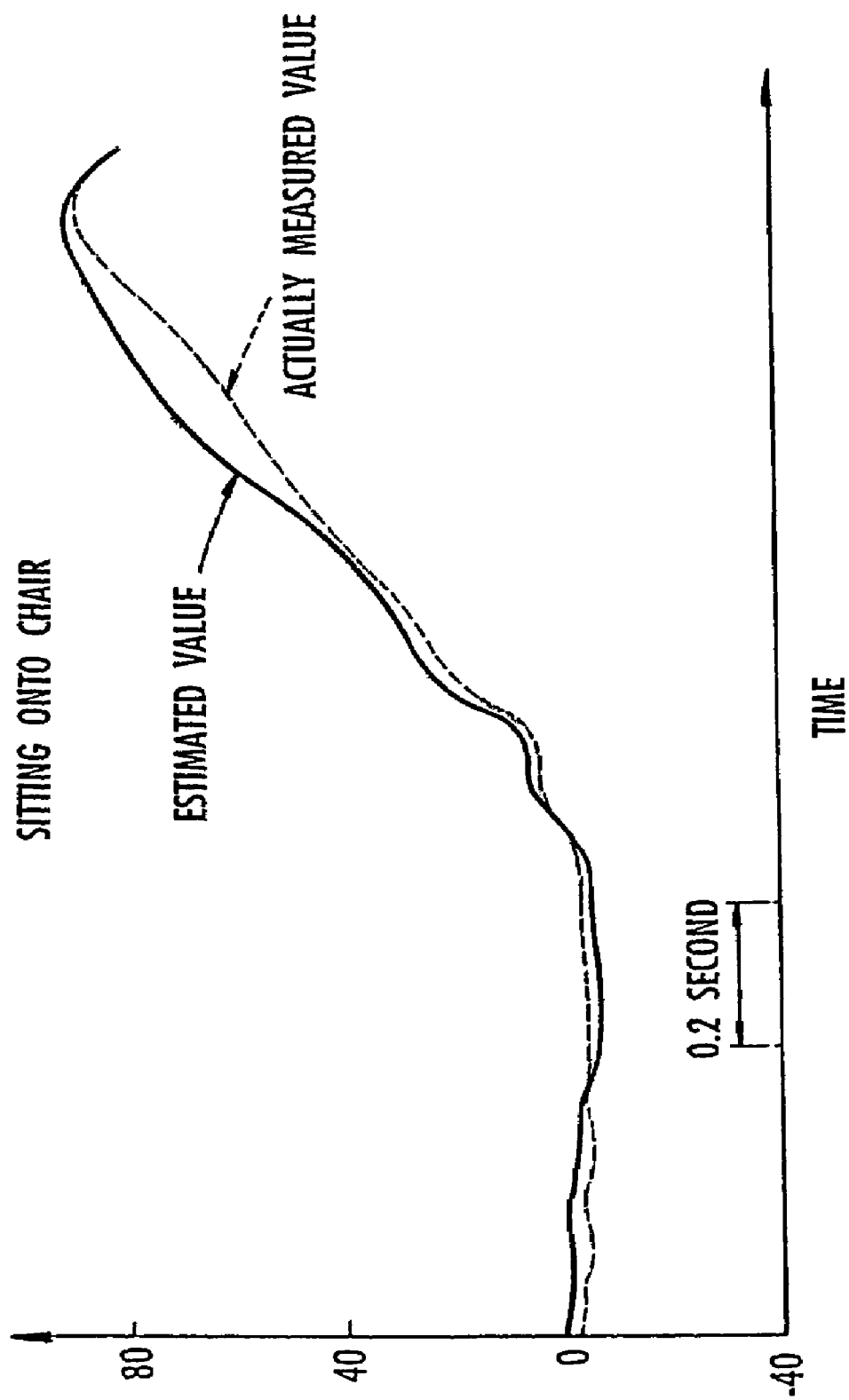
Figure 19:
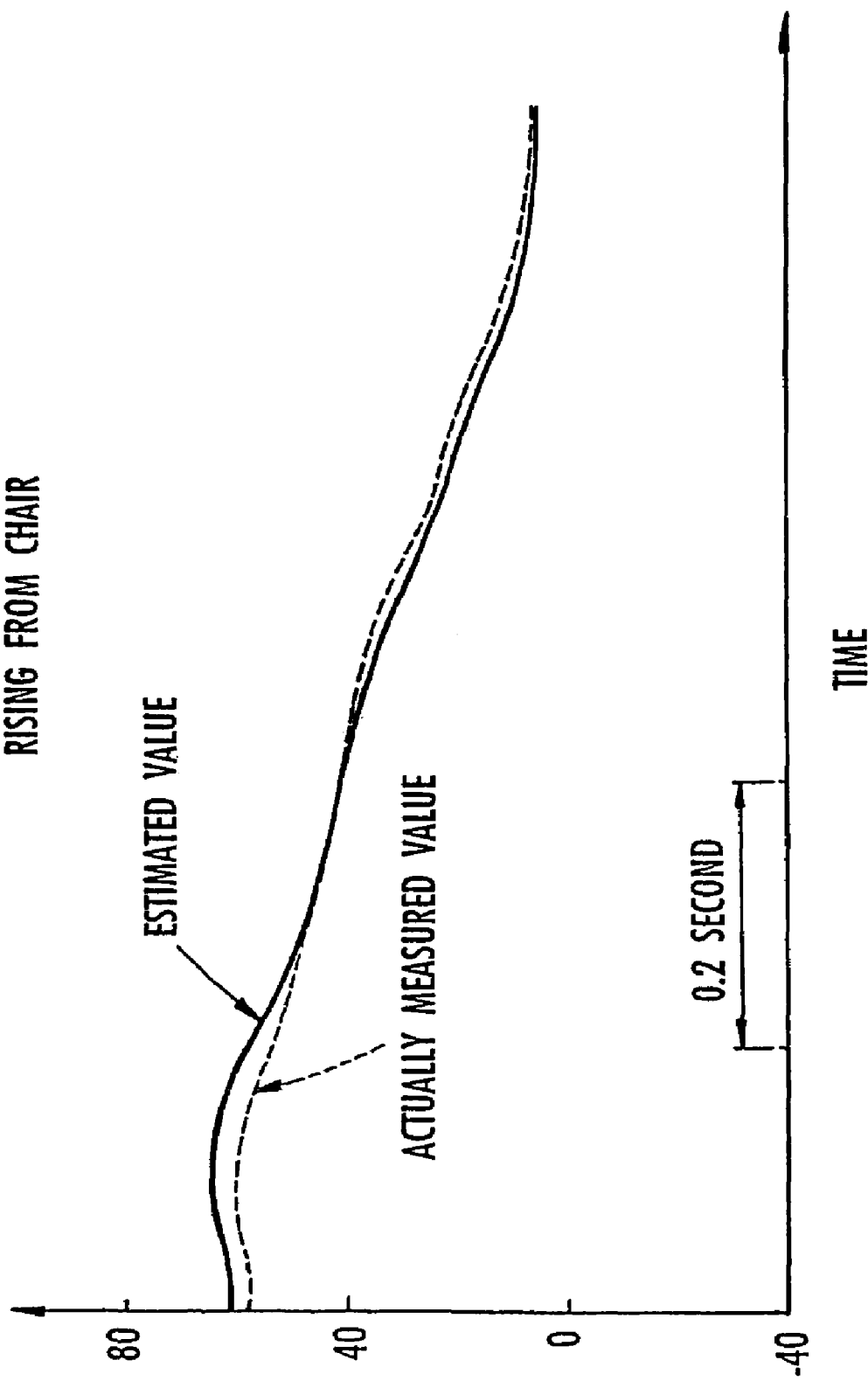
FIG. 19 and FIG. 20 are graphs illustrating the time-dependent changes in a knee joint moment and a hip joint moment, respectively, in a rising-from-a-chair mode determined according to the first embodiment of the present invention.
Figure 20:
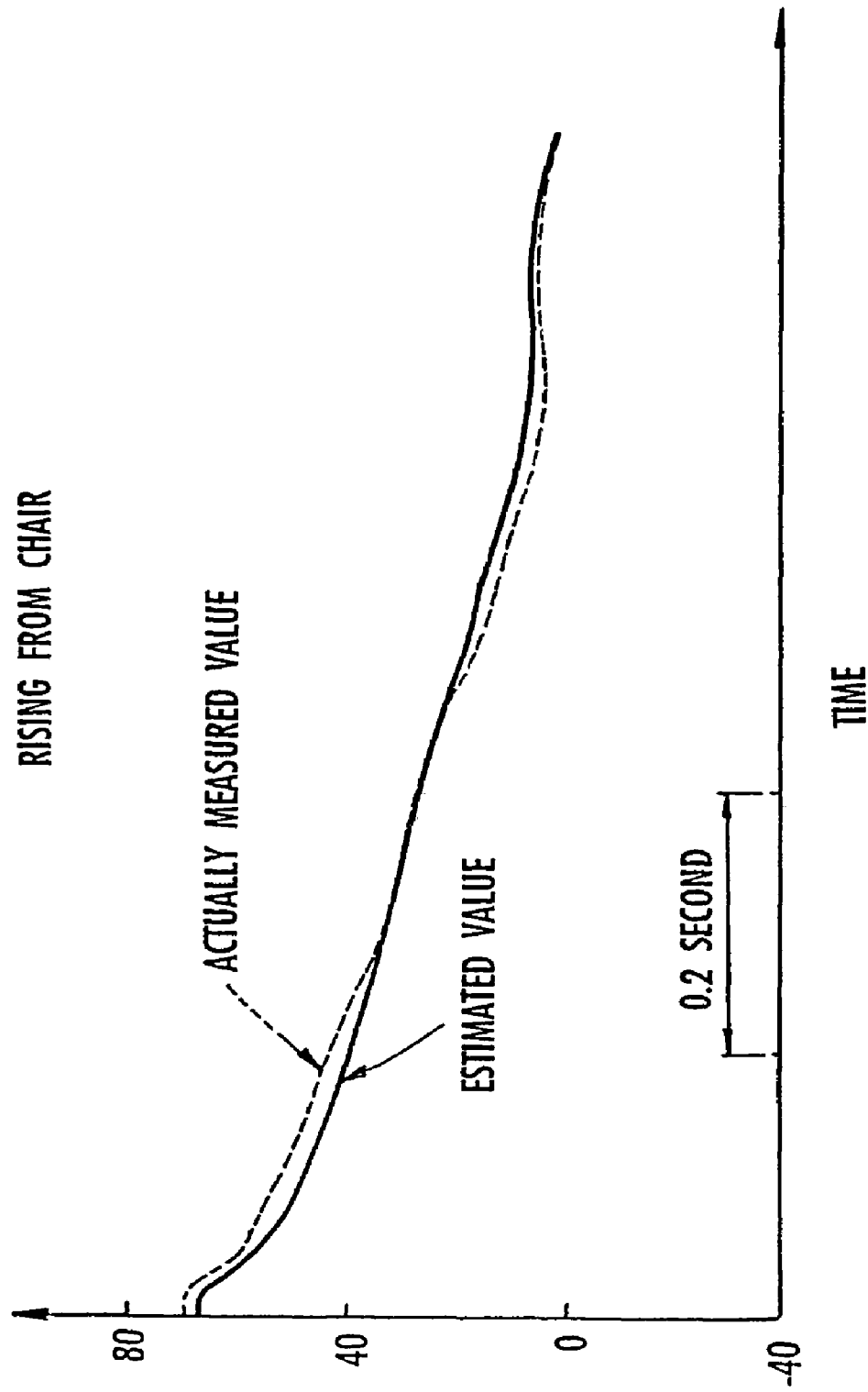

FIG. 11 to FIG. 20 show, with solid lines, the time-dependent changes of the estimated values of the moments of the knee joint 10 and the hip joint 8. FIG. 11 and FIG. 12 show the knee joint moment and the hip joint moment, respectively, determined by the arithmetic processing of the arithmetic processing unit 16 when the human being 1 performs level-ground walking at a moving speed of, for example, about 4.5 km/h. FIG. 13 and FIG. 14 show the knee joint moment and the hip joint moment, respectively, determined when the human being 1 walks down a staircase, and FIG. 15 and FIG. 16 show the knee joint moment and the hip joint moment, respectively, determined when the human being 1 walks up a staircase. Further, FIG. 17 and FIG. 18 show the knee joint moment and the hip joint moment, respectively, determined when the human being 1 sits onto a chair, and FIG. 19 and FIG. 20 show the knee joint moment and the hip joint moment, respectively, determined when the human being 1 rises from the chair. These FIG. 11 through FIG. 20 also indicate, with dashed lines, the moments actually measured using a torque meter or the like. As seen in these FIG. 11 through FIG. 20, the trend of the changes in the estimated values of the moment exhibits good agreement with actually measured values. Thus, it is understood that the estimated positions of the floor reaction force acting points determined in the present embodiment can be determined with sufficiently proper accuracy in estimating the joint moments of the legs 2.

As explained above, the present embodiment makes it possible to estimate the position of a floor reaction force acting point when the human being 1 is walking on a level ground, a staircase or a slope, or sitting onto a chair or rising from the chair, by a simple technique without using a plurality of types of correlation data or the like to estimate floor reaction force acting points.

A second embodiment of the present invention will now be explained with reference to aforementioned FIG. 2 to FIG. 8 and FIG. 21. The present embodiment differs from the first embodiment only partly in construction and processing; therefore, the constructions or functional parts that are identical to those of the first embodiment will be assigned the same reference numerals and drawings as those of the first embodiment, and the explanation thereof will be omitted.

Referring to FIG. 2, according to the present embodiment, in a human being 1, an ankle joint angle sensor 24 outputs a signal corresponding to a bending angle $\Delta\theta e$ of an ankle joint 12 is attached to the ankle joint 12 of each leg 2, in addition to the devices explained in the first embodiment. As in the knee joint angle sensor 23 or the like, the ankle joint angle sensor 24 is composed of a potentiometer, and secured to the ankle joint 12 through a belt or the like, which is not shown. Further, the ankle joint angle sensor 24 is connected to an arithmetic processing unit 16 through a signal line, which is not shown, to input its outputs to the arithmetic processing unit 16.

Here, the bending angle $\Delta\theta e$ detected by each ankle joint angle sensor 24 denotes the angle formed by the line, which connects the center of the ankle joint 12 and the center of an MP joint 13a of a foot 13 linked to the ankle joint 12, and the axis of a crus 11.

Referring to FIG. 3, in the arithmetic processing unit 16 in the present embodiment, an output of the above each ankle joint angle sensor 24 is received and supplied to an MP position calculating means 33. Further supplied to the MP position calculating means 33 are the positions of the ankle joint 12 (the positions in the bodily coordinate system Cp) calculated by an ankle position calculating means 32 in the same manner as that in the first embodiment, and also an inclination angle $\theta d$ of the crus 11 calculated by a leg posture calculating means 29.

The construction except for that explained above is identical to the construction of the first embodiment.

The present embodiment having the construction described above differs from the first embodiment only in the processing of the MP position calculating means 33 and the processing of a floor reaction force acting point estimating means 38 of the arithmetic processing unit 16. More specifically, the present embodiment is adapted to grasp the positions of the MP joint 13a more accurately than the first embodiment does so as to achieve higher accuracy of estimating the positions of floor reaction force acting points than in the first embodiment. The following will explain in detail the processing of the MP position calculating means 33 and the processing of the floor reaction force acting point estimating means 38 in the present embodiment.

In the processing of the MP position calculating means 33, the position of the MP joint 13a (more specifically, the positions in the x-axis direction and the z-axis direction in a bodily coordinate system Cp) is determined as follows by using detection data or the like of the ankle joint angle sensor 24.

Figure 21:
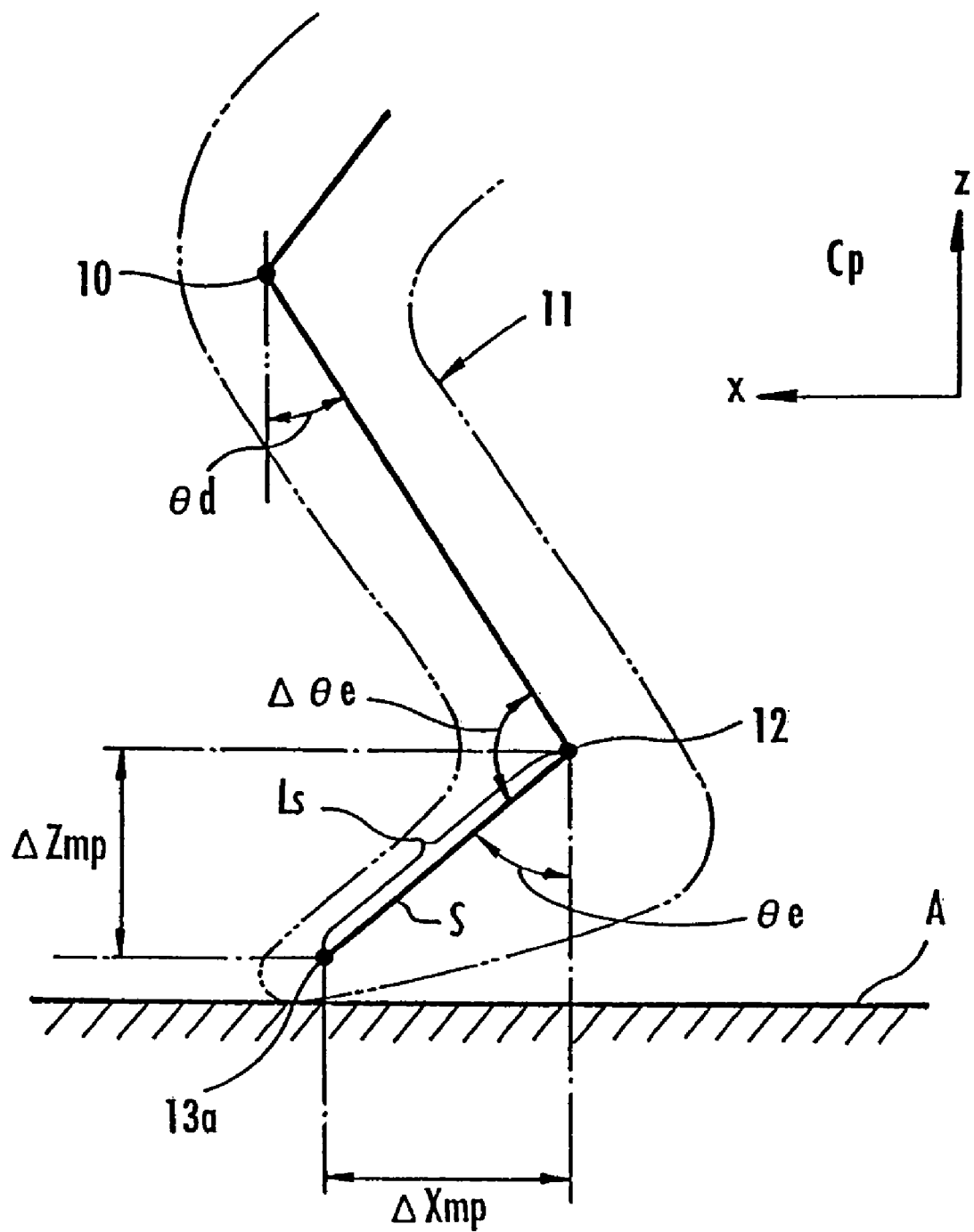
FIG. 21 is a diagram for explaining a technique for calculating the position of a metatarsophalangeal joint in a second embodiment of the present invention and a technique for grasping the distance from an ankle joint to a ground contact surface.

Referring to FIG. 21, a segment S connecting the center of the ankle joint 12 and the center of the MP joint 13a (hereinafter referred to as "the foot main line S") is assumed, the angle formed by the foot main line S with respect to the vertical direction (the z-axis direction) (the inclination angle of the foot main line S) is denoted by $\theta e$, and the length of the foot main line S (the distance between the ankle joint 12 and the MP joint 13a) is denoted by Ls. At this time, a distance $\Delta xmp$ in the horizontal direction (the x-axis direction) and a distance $\Delta zmp$ in the vertical direction (the z-axis direction) between the ankle joint 12 and the MP joint 13a, that is, a position $^T(\Delta xmp, \Delta zmp)$ of the MP joint 13a relative to the ankle joint 12 is given according to the following Equation (14):

$$^T(\Delta xmp, \Delta zmp) = (Ls \cdot \sin \theta e, Ls \cos \theta e) \quad (14)$$

In this case, the foot 13 may be regarded as substantially a rigid body, and at this time, Ls takes a constant.

Further, the inclination angle $\theta e$ of the foot main line S is given according to the following Equation (15), using the bending angle $\Delta\theta e$ of the ankle joint 12 detected by the ankle joint angle sensor 24 and the inclination angle $\theta d$ of the crus 11 determined by the leg posture calculating means 29:

$$\theta e = \theta d - (180 - \Delta\theta e) \quad (15)$$

In Equation (15), "degrees" is used as the unit of angles.

In the processing of the MP position calculating means 33, the inclination angle $\theta e$ of the foot main line S is first determined according to the above Equation (15) from the current value of the data of the inclination angle $\theta d$ of the crus 11 of each leg 2 determined by the leg posture calculating means 29, and the current value of the detection data of the bending angle $\Delta\theta e$ of the ankle joint 12 obtained from the ankle joint angle sensor 24 attached to the leg 2. Then, the position $^T(\Delta xp, \Delta zmp)$ of the MP joint 13a relative to the ankle joint 12 is determined according to the above Equation (14) from the determined inclination angle $\theta e$ and the length Ls of the foot main line S actually measured beforehand on the human being 1 and stored and retained in the arithmetic processing unit 16. Furthermore, the position of the MP joint 13a in the bodily coordinate system Cp is determined by calculating the vector sum of the position $^T(\Delta xmp, \Delta zmp)$ and the position of the ankle joint 12 determined by the ankle position calculating means 32 (the position in the bodily coordinate system Cp) $^T(x12, z12)$.

In the processing of the floor reaction force acting point estimating means 38, the horizontal position (the position in the x-axis direction) of a floor reaction force acting point of each leg 2 in contact with the ground is determined by the same technique as that in the first embodiment. Therefore, the explanation of the processing for estimating the horizontal positions of floor reaction force acting points will be omitted.

Meanwhile, in the processing of the floor reaction force acting point estimating means 38, the technique for estimating the vertical position (the position in the z-axis direction) of the floor reaction force acting point of each leg 2 in contact with the ground is different from that in the first embodiment; the vertical position of a floor reaction force acting point is decided as follows. First, on each leg 2 in contact with the ground, the distance between the ankle joint 12 of the leg 2 and the ground contact surface (a floor A), that is, the distance between the ankle joint and the ground contact surface, is grasped. In this case, the method for grasping the distance between an ankle joint and a ground contact surface is decided, depending on whether the bodily center of gravity G0is located before or behind the MP joint 13a in the x-axis direction. If the bodily center of gravity G0is located behind the MP joint 13a, then it is generally considered that the bottom of the heel of a foot 13 is substantially in contact with the floor A or is positioned at substantially the same height as the surface of the floor A. In this case, therefore, the aforesaid ankle joint reference height Ha actually measured when the human being 1 is in an upright stationary state and stored and retained beforehand in the arithmetic processing unit 16 (refer to FIG. 5) is grasped as the distance between the ankle joint and the ground contact surface.

If the bodily center of gravity G0is located before the MP joint 13a, then the heel of the foot 13 is usually floating above the surface of the floor A. In this case, the distance between the ankle joint and the ground contact surface is calculated as follows. Referring to the aforesaid FIG. 21, if the heel of the foot 13 is floating above the surface of the floor A, then the distance between the ankle joint and the ground contact surface will be the sum of the vertical distance $\Delta$zmp between the ankle joint 12 and the MP joint 13a and the distance between the MP joint 13a and the ground contact surface (the surface of the floor A). In this case, the distance between the MP joint 13a and the ground contact surface is substantially identical to a distance Hb between the MP joint 13a and the surface of the floor A (hereinafter referred to as "the MP joint reference height Hb") in a state wherein the human being 1 is standing in an upright posture with substantially the entire sole of the foot 13 in contact with the floor A (in the aforesaid upright stationary state), as shown in FIG. 5. Hence, according to the present embodiment, the MP joint reference height Hb is actually measured together with the ankle joint reference height Ha beforehand and stored and retained in the arithmetic processing unit 16. And, if the bodily center of gravity G0is located before the MP joint 13a, then the sum of the vertical distance $\Delta$zmp between the ankle joint 12 and the MP joint 13a grasped from the positions of these joints in the bodily coordinate system Cp and the MP joint reference height Hb is determined as the distance between the ankle joint and the ground contact surface.

The MP joint reference height Hb may be actually measured and retained in a memory for each foot 13, or the actually measured value of only one foot 13 may be shared for both feet 13 and 13. In correspondence to the floor reaction force acting point estimating method in accordance with the present invention, the ankle joint reference height Ha and the MP joint reference height Hb correspond to a first basic vertical distance and a second basic vertical distance, respectively.

After the distance between the ankle joint and the ground contact surface is grasped as described above, the vertical position (the position in the z-axis direction) of a floor reaction force acting point is determined as the position vertically apart downward from the position of the ankle joint 12 by the grasped distance between the ankle joint and the ground contact surface in the same manner as that in the first embodiment. In other words, the vertical position (the position in the bodily coordinate system Cp) of the floor reaction force acting point is determined as the value obtained by subtracting the distance between the ankle joint and the ground contact surface, which has been grasped as described above, from the value of the z-axis component of the position of the ankle joint 12 (the upward direction being defined as the positive direction of the z-axis).

In the present embodiment also, as in the first embodiment, in order to calculate a joint moment by a joint moment estimating means 40, the position in the bodily coordinate system Cp of the floor reaction force acting point decided as described above (xz-coordinate component) is converted into a position defined using the position of the ankle joint 12 in the bodily coordinate system Cp calculated by the ankle position calculating means 32 as its reference.

The processing of the arithmetic processing unit 16 except for the MP position calculating means 33 and the floor reaction force acting point estimating means 38 explained above is the same as that in the first embodiment.

The present embodiment makes it possible to grasp the positions of the MP joint 13a (the positions in the x-axis direction and the z-axis direction) with relatively high accuracy, thus allowing the positions, particularly the vertical positions, of floor reaction force acting points to be estimated with higher accuracy than that in the first embodiment. As a result, the joint moments acting on the knee joint 10 and the hip joint 8 can be estimated also with higher accuracy than that in the first embodiment.

The distance between an ankle joint and a ground contact surface determined to estimate the vertical position of a floor reaction force acting point can be determined by a technique other than the techniques explained in the first embodiment and the second embodiment. For example, an optical distance measuring sensor, such as an infrared distance measuring sensor, is attached to an appropriate portion of the crus 11 of each leg 2 (specifically, the portion apart from the ankle joint 12 toward the knee joint 10 by a predetermined distance in the axial direction of the crus 11), and the distance in the axial direction of the crus 11 between the portion to which the distance measuring sensor has been attached and a floor surface (the ground contact surface of the leg 2) is measured. Then, from the measured distance and the inclination angle $\theta$d of the crus 11, the vertical distance between the portion equipped with the distance measuring sensor and the floor surface (hereinafter referred to as "the distance between the sensor and the floor surface") is calculated by geometric computation (trigonometric function computation). Further, from the distance between the portion equipped with the distance measuring sensor and the ankle joint 12 (a fixed value) and the inclination angle $\theta$d of the crus 11, the vertical distance between the portion and the ankle joint 12 is determined by the trigonometric function computation, and then the determined vertical distance is subtracted from the aforesaid distance between the sensor and the floor surface so as to determine the distance between the ankle joint and the ground contact surface. Thus, determining the distance between the ankle joint and the ground contact surface makes it possible to accurately estimate the vertical position of a floor reaction force acting point without using the ankle joint angle sensor 24. In this case, the horizontal position of a floor reaction force acting point may be estimated using the same technique as that of the first embodiment.

In the embodiments explained above, the examples, in which the present invention has been applied to the human being 1, have been explained; however, the present invention can be applied also to a biped walking robot as a biped walking mobile body.

INDUSTRIAL APPLICABILITY

As is obvious from the above explanation, the present invention makes it possible to estimate a joint moment of a leg of a biped walking mobile body, such as a human being, so that the estimated joint moment can be applied for controlling the operation of a walking aid apparatus or the like that aids the walking of a human being. For example, a part of the estimated joint moment may be generated by the walking aid apparatus so as to conduct control for reducing load on the human being.

The invention claimed is:

1. A method of successively estimating the position of a floor reaction force acting point of each leg of a biped walking mobile body, comprising:
   a first step for successively grasping the position of the center of gravity of the biped walking mobile body, the position of the ankle joint of each leg, and the position of the metatarsophalangeal joint of the foot of the leg, respectively, and also successively grasping the vertical distance from the ankle joint to a ground contact surface of each leg in contact with the ground while the biped walking mobile body is in motion,
   a first ground contact sensor and a second ground contact sensor being provided on the sole of the foot of each leg of the biped walking mobile body, and the first and the second ground contact sensors outputting ground contact detection signals based on whether a place directly below an ankle joint of a leg and a place directly below a metatarsophalangeal joint of the foot of the leg, respectively, are in contact with the ground; and
   a second step wherein, for each leg in contact with the ground while the biped walking mobile body is in motion, the horizontal position of one of the center of gravity, the ankle joint of the leg, and the metatarsophalangeal joint of the leg, the positions thereof having been determined in the first step, is successively estimated selectively as the horizontal position of the floor reaction force acting point of the leg on the basis of at least the combination of contact or no contact with the ground indicated by a ground contact detection signal of the first ground contact sensor and contact or no contact with the ground indicated by a ground contact detection signal of the second ground contact sensor of each leg, and the vertical position of the floor reaction force acting point of the leg is successively estimated as the position apart vertically downward from the ankle joint by the vertical distance from the ankle joint to the ground contact surface of the leg determined in the first step.

2. The method of estimating a floor reaction force acting point of a biped walking mobile body according to claim 1, wherein, when estimating the horizontal position of the floor reaction force acting point in the second step, on each leg in contact with the ground, if a ground contact detection signal of the first ground contact sensor of each leg is a signal indicating contact with the ground and a ground contact detection signal of the second ground contact sensor of the leg is a signal indicating no contact with the ground, then the horizontal position of the ankle joint of the leg is estimated as the horizontal position of a floor reaction force acting point of the leg, or if a ground contact detection signal of the first ground contact sensor of each leg is a signal indicating no contact with the ground and a ground contact detection signal of the second ground contact sensor of the leg is a signal indicating contact with the ground, then the horizontal position of the metatarsophalangeal joint of the leg is estimated as the horizontal position of the floor reaction force acting point of the leg, or if ground contact detection signals of both the first ground contact sensor and the second ground contact sensor of each leg are signals indicating contact with the ground and if the position of the center of gravity is behind the position of the ankle joint of the leg in the advancing direction of the biped walking mobile body, then the horizontal position of the ankle joint of the leg is estimated as the horizontal position of the floor reaction force acting point of the leg, or if ground contact detection signals of both the first ground contact sensor and the second ground contact sensor of each leg are signals indicating contact with the ground and if the position of the center of gravity is before the position of the metatarsophalangeal joint of the leg in the advancing direction of the biped walking mobile body, then the horizontal position of the metatarsophalangeal joint of the leg is estimated as the horizontal position of the floor reaction force acting point of the leg, or if ground contact detection signals of both the first ground contact sensor and the second ground contact sensor of each leg are signals indicating contact with the ground and if the position of the center of gravity is between the position of the ankle joint and the position of the metatarsophalangeal joint of the leg in the advancing direction of the biped walking mobile body, then the horizontal position of the center of gravity is estimated as the horizontal position of the floor reaction force acting point of the leg.

3. The method of estimating a floor reaction force acting point of a biped walking mobile body according to claim 1, wherein the vertical distance from the ankle joint to a ground contact surface of each leg when the biped walking mobile body is in an upright stationary state is measured and retained in a memory beforehand, and when grasping the vertical distance from the ankle joint to the ground contact surface of each leg in contact with the ground in the first step, the vertical distance retained in the memory is grasped as the vertical distance from the ankle joint to the ground contact surface of each leg in contact with the ground.

4. The method of estimating a floor reaction force acting point of a biped walking mobile body according to claim 1, wherein
   the vertical distance from the ankle joint to a ground contact surface of each leg and the vertical distance from the metatarsophalangeal joint to the ground contact surface of the leg when the biped walking mobile body is in an upright stationary state are measured and retained in a memory beforehand as a first basic vertical distance and a second basic vertical distance, respectively,
   and when grasping the vertical distance from the ankle joint to the ground contact surface of each leg in contact with the ground in the first step, if the position of the center of gravity is behind the position of the metatarsophalangeal joint of the leg in the advancing direction of the biped walking mobile body, then the first basic vertical distance is grasped as the vertical distance from the ankle joint to the ground contact surface of the leg, or if the position of the center of gravity is before the position of the metatarsophalangeal joint of the leg in the advancing direction of the biped walking mobile body, then the vertical distance between the ankle joint and the metatarsophalangeal joint of the leg is determined, and then the value obtained by adding the second basic vertical distance to the determined vertical distance is grasped as the vertical distance from the ankle joint to the ground contact surface of the leg.

5. A method of estimating a joint moment of a biped walking mobile body for estimating a moment acting on at least one joint of each leg of the biped walking mobile body by using an estimated value of the position of a floor reaction force acting point successively determined by the method of estimating a floor reaction force acting point of a biped walking mobile body according to claim 1, comprising:

a step for successively estimating the floor reaction force of each leg, which is in contact with the ground, of the biped walking mobile body by using at least a detection output of an acceleration sensor attached to a body of the biped walking mobile body to detect the acceleration of a predetermined part of the body and a detection output of a body inclination sensor attached to the body to detect an inclination angle of the body, and a step for successively grasping the inclination angle of each rigid corresponding part of a biped walking mobile body that corresponds to each rigid body of a rigid link model representing the biped walking mobile body in the form of a link assembly of a plurality of rigid bodies, the acceleration of the center of gravity of the rigid corresponding part, and the angular acceleration of the rigid corresponding part by using at least detection outputs of the body inclination sensor and an angle sensor attached to a joint of each leg of the biped walking mobile body to detect the bending angle of the joint, wherein a moment acting on at least one joint of each leg of the biped walking mobile body is estimated on the basis of an inverse dynamics model by using an estimated value of the floor reaction force, an estimated value of the position of the floor reaction force acting point, an inclination angle of the each rigid corresponding part, the acceleration of the center of gravity of the rigid corresponding part and the angular acceleration of the rigid corresponding part, weight and size of each rigid corresponding part that have been determined in advance, the position of the center of gravity of each rigid corresponding part in the rigid corresponding part that has been determined in advance, and the inertial moment of each rigid corresponding part that has been determined in advance.

* * * * *